United States Patent
Leister et al.

(10) Patent No.: US 12,298,522 B2
(45) Date of Patent: May 13, 2025

(54) DISPLAY DEVICE AND METHOD FOR TRACKING A VIRTUAL VISIBILITY REGION

(71) Applicant: SEEREAL TECHNOLGIES S.A., Munsbach (LU)

(72) Inventors: Norbert Leister, Dresden Sachsen (DE); Bo Kroll, London (GB)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 16/956,352

(22) PCT Filed: Dec. 21, 2018

(86) PCT No.: PCT/EP2018/086493
§ 371 (c)(1),
(2) Date: Jun. 19, 2020

(87) PCT Pub. No.: WO2019/122295
PCT Pub. Date: Jun. 27, 2019

(65) Prior Publication Data
US 2020/0333609 A1    Oct. 22, 2020

(30) Foreign Application Priority Data

Dec. 21, 2017 (EP) .................................. 17209316
May 31, 2018 (EP) .................................. 18175346

(51) Int. Cl.
*G02B 27/01* (2006.01)
*G02F 1/13* (2006.01)
(Continued)

(52) U.S. Cl.
CPC ..... *G02B 27/0179* (2013.01); *G02B 27/0172* (2013.01); *G03H 1/02* (2013.01);
(Continued)

(58) Field of Classification Search
CPC .............. G02B 27/017; G02B 27/0179; G02B 27/0172; G02B 2027/0174;
(Continued)

(56) References Cited

U.S. PATENT DOCUMENTS 5,703,637 A * 12/1997 Miyazaki ........... G02B 27/0172
                                                           348/E5.145
7,400,431 B2 * 7/2008 Schwerdtner .......... H04N 13/31
                                                           359/23
(Continued)

FOREIGN PATENT DOCUMENTS

EP       2631720 A1      8/2013
GB       2379351 A  *   3/2003  ........... G03H 1/2294
(Continued)

OTHER PUBLICATIONS

International Search Report, dated Jun. 26, 2019, and Written Opinion issued in International Application No. PCT/EP2018/086493, Jun. 26, 2019.

(Continued)

*Primary Examiner* — Nitin Patel
*Assistant Examiner* — Cory A Almeida
(74) *Attorney, Agent, or Firm* — Saul Ewing LLP

(57) ABSTRACT

The invention relates to a display device for representing two-dimensional and/or three-dimensional scenes. The display device comprises at least one illumination device to emit sufficiently coherent light, at least one spatial light modulation device, at least one optical system and a tracking device. A hologram is encoded into the at least one spatial light modulation device by means of a single-parallax encoding. The at least one optical system is provided to generate at least one virtual visibility region at the position of an eye of an observer. The encoding direction of the
(Continued)

hologram on the spatial light modulation device is modifiable by means of the tracking device.

29 Claims, 10 Drawing Sheets

(51) Int. Cl.
| | |
|---|---|
| *G02F 1/1334* | (2006.01) |
| *G02F 1/1337* | (2006.01) |
| *G02F 1/1347* | (2006.01) |
| *G02F 1/19* | (2019.01) |
| *G02F 1/29* | (2006.01) |
| *G03H 1/02* | (2006.01) |
| *G03H 1/04* | (2006.01) |
| *G03H 1/08* | (2006.01) |
| *G03H 1/22* | (2006.01) |
| *G06F 3/01* | (2006.01) |

(52) U.S. Cl.
CPC ............ *G03H 1/08* (2013.01); *G03H 1/2205* (2013.01); *G03H 1/2294* (2013.01); *G06F 3/013* (2013.01); *G02B 2027/0174* (2013.01); *G02B 2027/0187* (2013.01); *G02F 1/1323* (2013.01); *G02F 1/13342* (2013.01); *G02F 1/133711* (2013.01); *G02F 1/1347* (2013.01); *G02F 1/19* (2013.01); *G02F 1/292* (2013.01); *G02F 2203/24* (2013.01); *G03H 2001/0212* (2013.01); *G03H 2001/0216* (2013.01); *G03H 2001/0423* (2013.01); *G03H 2001/0825* (2013.01); *G03H 2001/2207* (2013.01); *G03H 2001/221* (2013.01); *G03H 2001/2223* (2013.01); *G03H 2001/2236* (2013.01); *G03H 2222/22* (2013.01); *G03H 2223/12* (2013.01); *G03H 2223/14* (2013.01); *G03H 2223/22* (2013.01); *G03H 2223/23* (2013.01); *G03H 2223/55* (2013.01); *G03H 2226/05* (2013.01); *G03H 2227/03* (2013.01)

(58) Field of Classification Search
CPC ......... G02B 2027/0187; G03H 1/2205; G03H 1/2294; G03H 2223/22; G03H 2226/05; G03H 1/02; G03H 1/08; G03H 2001/0212; G03H 2001/0216; G03H 2001/0423; G06F 3/013; G02F 1/1323; G02F 1/13342; G02F 1/133711; G02F 1/1347; G02F 1/19; G02F 1/292; G02F 2203/24

See application file for complete search history.

(56) References Cited

U.S. PATENT DOCUMENTS

| | | | |
|---|---|---|---|
| 10,684,489 B2 | 6/2020 | Kroll et al. | |
| 2009/0207466 A1* | 8/2009 | Bucklay | H04N 5/7441 359/9 |
| 2013/0022222 A1* | 1/2013 | Zschau | G03H 1/2249 359/9 |
| 2013/0222873 A1* | 8/2013 | Kwon | G03H 1/2294 359/9 |
| 2014/0055692 A1* | 2/2014 | Kroll | G02F 1/1347 349/15 |

FOREIGN PATENT DOCUMENTS

| | | |
|---|---|---|
| WO | 2006/066919 A1 | 6/2006 |
| WO | 2010/149587 A2 | 12/2010 |
| WO | 2018037077 A2 | 3/2018 |

OTHER PUBLICATIONS

Haussler, et al., "Large holographic displays as an alternative to stereoscopic displays", Visual Communications and Image Processing; Bd. 6803, XP009156432, Jan. 1, 2008.

Park, Minsik, et al., "Digital Holographic Display System wtih Large Screen Based on Viewing Window Movement for 3D Video Service", ETRI Journal, Bd. 36, Nr. 2, pp. 232-241 XP055456037, Apr. 1, 2014.

Reichelt, Stephan, et al., "Holographic 3-D Displays—Advances in Lasers and Electro Optics, Electro-holography within the Grasp of Commercialization," ResearchGate, Chapter 29, pp. 683-710 (2010).

St. Hilaire, Pierre, et al., "Synthetic aperture holography: a novel approach to three-dimensional displays," J. Opt. Soc. Am. A, vol. 9, No. 11, pp. 1969-1944 (1992).

* cited by examiner a)

b)

c)

a)

b)

DISPLAY DEVICE AND METHOD FOR TRACKING A VIRTUAL VISIBILITY REGION

CROSS REFERENCE TO RELATED APPLICATIONS

This application claims the priority of PCT/EP2018/086493, filed on Dec. 21, 2018, which claims priority to European Application No. EP 17209316.3, filed on Dec. 21, 2017, and European Application No. EP 18175346.8, filed on May 31, 2018, the entire contents of each of which are incorporated fully herein by reference.

BACKGROUND OF THE INVENTION

The invention relates to a display device for representing two-dimensional and/or three-dimensional scenes. The invention is intended to relate, in particular, to a holographic display device, in particular a display device provided near to the eye of an observer, such as, for example, a head-mounted display. The invention further relates to a method with which a tracking of a virtual visibility region, particularly in a small region, can be implemented.

Compared with autostereoscopic displays or display devices, holographic displays or display devices pose substantially greater challenges in terms of the resolution of a spatial light modulation device present in the holographic display device and used for the encoding of a hologram and in terms of the computational effort of the hologram.

WO 2006/066919 A1 describes, for example, how these requirements can be reduced. The generation of a virtual observer window, for example, is described there, said window being provided within a diffraction order of the Fourier spectrum of the hologram encoded in the spatial light modulation device and through which an observer can observe a reconstructed, preferably three-dimensional scene in a reconstruction space which can extend in front of and/or behind the spatial light modulation device.

In terms of a reconstruction of an individual object point, this means that a subhologram is encoded into the spatial light modulation device for any given object point of the scene. The extension and the position of the subhologram on the spatial light modulation device can be defined in one embodiment, for example, through a projection of the virtual observer window or the visibility region over the object point onto the spatial light modulation device. The overall hologram of the preferably three-dimensional scene having a multiplicity of object points is represented as an overlay of subholograms of all object points of the three-dimensional scene. The individual subholograms do not completely overlay one another, but are instead shifted in relation to one another according to their object points which are to be reconstructed, so that only a part of their surface is overlaid by one or more subholograms.

In other words, spatial image points can be generated in a holographic display device through the encoding of object points in subholograms. The encoding can be carried out in an external general computer system or in a control unit installed in the holographic display. It is already known that the extension of any subhologram in the spatial light modulation device can be fixed, for example dependent only on the depth position of an object point in relation to the spatial light modulation device, or can be variable according to requirements. It is further known that the geometric position of the subhologram on the spatial light modulation device and its extension can change according to technical requirements, such as, for example, the position of the eyes of an observer of the reconstructed scene in relation to the light modulation device or the position of a voxel or a pixel within the scene to be represented. The calculation of the encoding values of the display points is generally made up of the encoding values of many object points. The calculation of the encoding values is usually performed in a calculation unit with higher resolution than the actual panel bit depth. The normalization and mapping onto the pixel values are performed only after the calculation of the encoding values, where, for example, non-linearities of the gamma curve or further pixel-dependent calibration values can be taken into account.

A plurality of different or similar pixels or subpixels of the spatial light modulation device can further be combined into a macropixel. However, spatial light modulation devices can also be existent in which this is not the case. Spatial light modulation devices of this type can similarly be used according to the invention.

FIG. 1 shows a device in which subholograms SH are generated for a multiplicity of object points having differing depth in relation to a spatial light modulation device SLM as a projection of a virtual visibility region VW over the respective object point onto the spatial light modulation device SLM. It is clearly evident that the position of the subholograms on the spatial light modulation device SLM is dependent on the position of the object points relative to the visibility region VW. The dimension or extension or size of the subholograms is further dependent on the z-position of the encoded object point, where z is the distance between the object point and the spatial light modulation device SLM. An overlap of subholograms occurs in most cases.

For a holographic reconstruction of scenes, preferably three-dimensional scenes, subholograms are used in conjunction with a virtual visibility region, also referred to as an observer region or observer window, through which an observer can observe the reconstructed scene.

In terms of head-mounted displays (HMD), head-up displays (HUD) or projection displays with a real or virtual image of the spatial light modulation device, also abbreviated to SLM, the term "SLM" used here is intended to refer to the image of the SLM which is visible from the virtual visibility region.

The writing in of a complex-valued hologram into the spatial light modulation device is normally required for the generation of the three-dimensional scene by means of holography.

A plurality of pixels of the spatial light modulation device can either be combined here by means of encoding to form a macropixel or can be combined with a beam combiner to form a macropixel.

A holographic display device is based, inter alia, on the effect of diffraction at the apertures of the pixels of the spatial light modulation device and the interference of coherent light which is emitted by a light source. However, some important conditions for a holographic display device which generates a virtual visibility region can be formulated and defined with geometric optics, and will be briefly mentioned here.

The illumination beam path in the display device, on the one hand, is important here. This serves, inter alia, to generate a virtual visibility region. A spatial light modulation device is illuminated by means of an illumination device which comprises at least one real or virtual light source. The light emanating from the different pixels of the spatial light modulation device must then be directed in each case into the virtual visibility region. To do this, the at least one light source of the illumination device which illuminates the spatial light modulation device is usually imaged into an observer plane having the virtual visibility region. This imaging of the light source is performed, for example, into the center of the virtual visibility region. If a spatial light modulation device is illuminated with a plane wave which corresponds to a light source at infinity, light from different pixels of the spatial light modulation device, for example, said light emerging perpendicularly to these pixels, is focused into the center of the virtual visibility region. Light which does not emanate perpendicularly but instead in each case at the same diffraction angle from different pixels of the spatial light modulation device is then similarly focused in each case at the same position in the virtual visibility region. However, the virtual visibility region can generally also be shifted laterally in relation to the image of the at least one light source, for example the position of the image of the at least one light source can coincide with the right or left edge of the visibility region.

On the other hand, the imaging beam path is important in the holographic display device, except in a direct-view display. An enlarged imaging, for example, of a spatial light modulation device which is small in its extension is normally generated in a head-mounted display (HMD). This is often a virtual image which the observer sees at a greater distance than the distance at which the spatial light modulation device itself is located. The individual pixels of the spatial light modulation device are usually imaged in enlarged form.

The explanations according to the invention are mainly intended to refer to the case in which the virtual visibility region which contains a virtual observer window and a sweet spot is present in the plane of the light source image. However, through respective transposition of the imaging beam path and the illumination beam path or the plane of the spatial light modulation device and the Fourier plane, the statements made are also applicable accordingly to embodiments of a holographic display device or display with an imaging of the spatial light modulation device into the virtual visibility region. The present invention is not therefore intended to be limited to the case with a virtual visibility region, i.e. a virtual observer window or sweet spot, in the plane of the light source image.

The possibilities of using a full-parallax encoding or a single-parallax encoding are known in principle for a calculation of holograms or subholograms.

In the case of a holographic display device or display which generates a virtual visibility region, a full-parallax encoding means that the virtual visibility region has a horizontal extension and a vertical extension, where these two extensions are less than or equal to a generated diffraction order in the respective dimension. The size of the diffraction order is determined by the respective horizontal pixel pitch or the vertical pixel pitch of a spatial light modulation device used, the wavelength of the light used and by the distance between the spatial light modulation device and the virtual visibility region. The virtual visibility region is formed by a two-dimensional virtual observer window. A subhologram of an object point of a three-dimensional (3D) scene also has a horizontal extension and a vertical extension normally comprising a plurality of pixels on the spatial light modulation device. The subhologram focuses light in both a horizontal direction and a vertical direction so that the object point is reconstructed. The virtual visibility region and the subhologram can both have, for example, a rectangular shape, but in the general case other shapes also, such as, for example, a round or hexagonal shape.

By way of comparison, in the case of a single-parallax encoding of a hologram or subhologram into the spatial light modulation device, the extension of a generated virtual observer window is restricted by the extension of a diffraction order in one dimension or direction only, which is referred to below as the encoding direction of the hologram or subhologram. The subhologram normally takes up a part of a single pixel row in the case of a horizontal single-parallax encoding or a part of a single pixel column in the case of a vertical single-parallax encoding on the spatial light modulation device, accordingly having an extension normally comprising more than one pixel in one dimension or direction only. In this case, the subhologram essentially corresponds to a cylindrical lens which focuses the light in one direction.

This situation can be explained in other words in such a way that, in the case of a single-parallax encoding, a virtual observer window is present in one dimension or direction only, i.e. the encoding direction of the hologram, and an optimal viewing range, which is also referred to as a sweet spot, similar to a stereo display, is present in the other dimension or direction, i.e. perpendicular to the encoding direction. The term "sweet spot direction" is therefore also used in this document if the encoding direction of the hologram is not being referred to. The virtual observer window and the sweet spot together then form a virtual visibility region in an observer plane in which an observer is located to observe the generated scene. This designation and meaning of the virtual visibility region are furthermore used in the following disclosures according to the invention.

A full-parallax encoding of a hologram or subhologram requires sufficient coherent light equally in all directions or spatial directions, said light having to be emitted by a light source. In contrast, a single-parallax encoding requires sufficient coherent light only at least in the encoding direction of the hologram. In the sweet spot direction, the non-encoding direction of the hologram, the coherence of the light can be less than in the encoding direction of the hologram.

The coherence of the light can be set, for example, by the angular spectrum of the illumination of a spatial light modulation device. A different coherence of the light in the encoding direction of the hologram and in the sweet spot direction can be set, for example, by using a slit-shaped light source. A different angular spectrum and a different coherence of the light are produced in the narrow direction of the slit-shaped light source compared with the long direction of the slit-shaped light source.

A different coherence of the light in the encoding direction and in the sweet spot direction can also be set, for example, by a scatterer which is disposed, for example, between a light source and the virtual visibility region, either upstream or downstream of the spatial light modulation device in the light propagation direction, and which has a different scatter characteristic in the encoding direction of the hologram and in the sweet spot direction, in particular a very narrow scatter angle in the encoding direction and a wide scatter angle in the sweet spot direction. A scatterer of this type is also known as a one-dimensional (1D) scatterer. Scatterers exist, for example, as a product with a scatter angle of 40° in one direction and 1° in a direction perpendicular thereto.

However, an illumination which is equally coherent in the encoding direction of the hologram and in the sweet spot direction can optionally also be used in the case of a single-parallax encoding, where the extension of the virtual observer window is a maximum of one diffraction order in the encoding direction and the extension of the sweet spot can be a plurality of diffraction orders in the sweet spot direction.

Horizontal single-parallax encodings or vertical single-parallax encodings are generally known. A single-parallax encoding can normally be used in combination with rectangular-shaped pixels of a spatial light modulation device and/or with spatial color multiplexing and/or spatial multiplexing of the left/right eye on the spatial light modulation device with color filters disposed in the form of strips. The size of a virtual observer window is proportional to the reciprocal of the pixel pitch. In the case of a display without color filters but with rectangular pixels, a smaller virtual observer window would therefore disadvantageously be produced in the long direction of the pixel, i.e. in the direction of the larger pitch, than in the short direction of the pixel, i.e. the direction of the smaller pitch. The direction of the smaller pixel pitch is therefore normally used as the encoding direction of the hologram in the case of a single-parallax encoding with rectangular-shaped pixels in a display without color filters.

In a display with a spatial color multiplexing, holograms can be written in in interleaved form for different colors (normally red, green, blue). In the case of illumination with a light source having one color, for example with red laser light, the color filters of the other colors (for example green and blue) block the light. For this light source, the other color filters act in a manner similar to black areas which block light. For the light of one color, the color pixel therefore acts in the same way as a pixel with a smaller aperture in the direction perpendicular to the color filter strips. Disadvantageously for a virtual observer window, the smaller aperture in this direction would result in more light in higher diffraction orders. In this case, the pitch perpendicular to the color filter strips which determines the size of the virtual observer window is the pitch to the nearest pixel with the same color filter.

The direction parallel to the color filter strips, for example, would be used as the encoding direction of the hologram, since a larger pixel aperture is normally present in this direction and more light is present in the desired diffraction order. Conversely, the direction perpendicular to the color filter strips can advantageously be used in that the smaller pixel aperture results in more light in the higher diffraction orders, since a plurality of diffraction orders can also be used for the sweet spot. An additional scatter element for generating the sweet spot can possibly be dispensed with.

The same applies to spatial multiplexing of the left and right eye of an observer. Here, perpendicular to the multiplex strips for the two eyes of the observer, the pixel pitch to the nearest pixel for the same eye and possibly for the same color would determine the size of the virtual observer window. The multiplex strips again effectively act as a smaller aperture in the direction perpendicular to the strips. The encoding direction would normally be chosen parallel to the multiplex strips.

The examples show that the single-parallax encoding is normally a fixed choice in combination with specific parameters of a spatial light modulator or a color or spatial multiplexing arrangement.

Holographic display devices or displays using a virtual visibility region normally require a tracking of the virtual visibility region in the event of a change or movement of the eye position of an observer.

The eye position is normally detected with a detection system (eye finder). Optical elements, for example diffraction elements for light deflection, as disclosed, for example, in WO 2010/149587 A2, can furthermore be used to shift or track the virtual visibility region to a new detected eye position.

Solutions for combining coarse tracking and fine tracking of the virtual visibility region to a new position of an eye of an observer following a movement of the eye are already disclosed in the prior art. A combination of different optical elements is used, one optical element of which tracks the virtual visibility region over a wide angular range in coarse or large steps to a new detected eye position, this being referred to as coarse tracking. However, a second optical element tracks the virtual visibility region over a narrow angular range in fine or small steps to the new detected eye position, this being referred to as fine tracking. However, the use of two different conventional optical elements for tracking the virtual visibility region to a different position in an observer plane can to some extent be cumbersome.

Specific types of holographic display devices or displays, for example a holographic head-mounted display (HMD), require only a small eye-tracking region. An HMD can, for example, be fixedly attached to the head of an observer similar to spectacles or goggles, so that the entire device moves along with head movements. In this case, no separate tracking or, in particular, no coarse tracking is required. A tracking of the virtual visibility region is then required only if the position of the pupil of the observer's eye changes or moves substantially within the eye or otherwise moved out of the virtual visibility region. The use of conventional optical elements to track the virtual visibility region would be rather cumbersome here also, since it would, inter alia, increase the total volume and the weight of an HMD, this being particularly disadvantageous in the case of a device attached to the head of an observer. This could furthermore disadvantageously impact on light efficiency and energy consumption, which would be particularly disadvantageous in the case of a mobile, normally battery-operated, device.

WO 2018/037077 A2, for example, describes possibilities for shifting a virtual observer window over a small region by means of encoding through prism functions for fine tracking. However, this can be done only over a small number of diffraction orders due to the intensity of a reconstruction which generally decreases toward higher diffraction orders. The smaller a diffraction order is, the smaller the area, in particular, of possible shift through encoding of prism functions is also.

It is possible in principle to choose the virtual visibility region also in such a way that its extension is smaller than the extension of a pupil of an observer's eye. This can be done, for example, by generating diffraction orders which are less than the extension of a pupil of the observer's eye by choosing the pixel pitch of a spatial light modulation device, an observer distance and a wavelength of the light, and by using a filter arrangement which filters out other diffraction orders so that only a single diffraction order can reach the pupil of the observer.

If the size of the virtual visibility region is, for example, approx. 1 mm, since a diffraction order is only approx. 1 mm in size, the possible region of a shift within a small number of diffraction orders is limited to slightly less than approx. ±1 mm to 2 mm through encoding of e.g. prism functions. This would not suffice, for example in a head-mounted display, to cover the range of possible pupil movements within an eye.

SUMMARY OF THE INVENTION

The object of the present invention is therefore to provide a display device which enables the implementation with simple means of a fine tracking or a tracking of a virtual visibility region in a small region.

In particular, a solution is intended to be provided for a near-to-eye holographic display device, such as, for example, a holographic head-mounted display, which generates a small virtual visibility region, in particular a virtual visibility region of less than the pupil of an observer's eye, in order to implement a tracking of the virtual visibility region with movement of the eye pupil within the eye.

An object of the invention is furthermore to provide a corresponding method for a fine tracking of a virtual visibility region.

The present object is achieved according to the invention by a display device with the features of the claims.

A display device is provided according to the invention which is suitable, in particular, for use as a near-to-eye display and here, in particular, as a head-mounted display, but the use is not intended to be limited to these displays or display devices. The display device could also be used, for example, as a future head-up display which has a larger field of view than hitherto conventionally available head-up displays, or as a direct-view display in which a coarse tracking and also a fine tracking of a virtual visibility region can be performed.

However, the present invention is intended to relate only to a fine tracking of the virtual visibility region and to offer a solution in this respect. According to the invention, a fine tracking of the virtual visibility region is intended to be understood to mean a tracking which extends over a small range of a few millimeters, for example a range of up to approx. 25 mm, in each case in a horizontal and/or vertical direction.

A display device of this type according to the invention for representing two-dimensional and/or three-dimensional objects or scenes which is designed, in particular, as a holographic display device comprises at least one illumination device to emit sufficiently coherent light, at least one spatial light modulation device to modulate incident light, at least one optical system and a tracking device. A hologram is encoded into the at least one spatial light modulation device by means of a single-parallax encoding. The at least one optical system is provided to generate at least one virtual visibility region at the position of an eye of an observer. The encoding direction of the hologram for object points of the scene to be represented is changeable on the spatial light modulation device by means of the tracking device. The tracking device can be provided, in particular, for the fine tracking of the at least one virtual visibility region to a changed position of the eye of the observer.

The hologram represents the sum of all subholograms, where a subhologram is assigned to each object point of the scene which is to be represented. A change in the encoding direction of the hologram means that the encoding direction also changes for each individual subhologram.

The at least one virtual visibility region can particularly advantageously be moved to a different position according to the new position of a pupil of an observer's eye due to the change in the encoding direction of the hologram on the at least one spatial light modulation device. The hologram is encoded into the at least one spatial light modulation device by means of a single-parallax encoding, i.e. it is then added together from one-dimensional subholograms. Different encoding directions of the hologram can thus be achieved through a rotation of the one-dimensional subholograms in different directions starting from their original center points on the at least one spatial light modulation device. This means that the encoding direction of the hologram is changed for the fine tracking and the at least one virtual visibility region can therefore also be moved, i.e. rotated, due to the rotation of the hologram so that the at least one virtual visibility region tracks the eye pupil accordingly when it moves or can always overlap with it so that the observer of the scene can always observe said scene with correspondingly high resolution.

A change in the encoding direction of a hologram on the spatial light modulation device therefore means that the hologram calculation is adjusted so that subholograms can be encoded either in a part of a pixel row or in a part of a pixel column or along diagonally disposed pixels of the spatial light modulation device and can then be added together to form a hologram. The hologram calculation consequently changes for the same represented, preferably three-dimensional, scene depending on the chosen encoding direction of the hologram.

This tracking facility according to the invention is suitable, in particular, for a fine tracking of the at least one virtual visibility region, i.e. for only small movements of the eye pupil or of the eye directly, such as those which can occur e.g. if a head-mounted display is used. For movements in which the observer himself also moves to a different position, for example in conjunction with direct-view display devices, such a large tracking of the at least one virtual visibility region is implemented only through coarse tracking, where the fine tracking according to the invention can be used thereafter for the exact positioning of the at least one virtual visibility region in relation to the eye region.

Coarse tracking would, for example, change the position of a virtual visibility region in step widths of approx. 25 mm horizontally and vertically. However, fine tracking would be used within a region of approx. 25 mm horizontally×25 mm vertically. However, the invention is not intended to be limited to this numerical example.

In this way, a tracking device can be provided which is less elaborate than, for example, a diffraction device according to WO 2010/149587 A2. A head-mounted display can thus be designed to be structurally more compact and less expensive.

Further advantageous embodiments and refinements of the invention can be found in the further dependent claims.

The at least one virtual visibility region can advantageously be formed from a virtual observer window and a sweet spot, where the virtual observer window is provided in the encoding direction of the hologram and the sweet spot is provided in the non-encoding direction of the hologram.

In the case of a single-parallax encoding, the at least one virtual visibility region is formed by a virtual observer window which is generated in the encoding direction of the hologram, and by a sweet spot which is generated in the non-encoding direction, i.e. in the sweet spot direction. In the sweet spot direction, the light is distributed over an extended sweet spot which is narrower than the eye distance of an observer. The extension of the sweet spot is furthermore greater than the extension of the virtual observer window in the encoding direction.

In one particularly advantageous embodiment of the invention, it can be provided that the encoding direction of the hologram is changeable between at least two directions.

Four possible encoding directions can preferably be used, such as, for example, horizontal, vertical, diagonal +45 degrees or diagonal 135 degrees, seen relative to the pixel rows or pixel columns of the spatial light modulation device into which the hologram is encoded in order to adjust or track the at least one virtual visibility region to a new position of the eye or the eye pupil. However, the invention is not intended to be limited to these four mentioned encoding directions of a hologram. Further, different encoding directions, such as e.g. diagonal 30 degrees, are obviously also possible in addition to these four encoding directions. Furthermore, the invention is also not intended to be limited to rectangular-shaped pixels of the at least one spatial light modulation device, said pixels being able to be disposed in the form of rows and columns. Pixels could also be hexagonal-shaped, for example, and six different encoding directions could be formed parallel to the sides of the hexagon.

In a further advantageous embodiment of the invention, it can be provided that at least one position detection system is provided with which the position of an eye, in particular an eye pupil, of an observer of the scene is determinable. In addition, the size of the eye pupil can optionally be detected.

In order to determine a suitable encoding direction of a hologram on the at least one spatial light modulation device, the eye position of an observer is detected with a position detection system. The encoding direction of the hologram to be encoded can be decided on the basis of the detected eye position so that the generated at least one virtual visibility region also coincides with the eye of the observer. To do this, the encoding direction in which the at least one virtual visibility region is best or most suitably overlaid with the eye or the eye pupil can be selected for the respective eye position of the observer from different encoding directions, such as e.g. horizontal, vertical, diagonal, where further directions are not intended to be excluded.

In one preferred embodiment, a spatial light modulation device can be used which has a similar or identical pixel pitch in the horizontal direction and in the vertical direction. In one preferred embodiment, if macropixels composed of a plurality of pixels of the spatial light modulation device are used to represent complex values of object points of a scene, the spatial light modulation device can have the same macropixel pitch in the horizontal direction and in the vertical direction.

Both the size or extension of the virtual observer window and the size or extension of the sweet spot in an observer plane in which an observer is located can optionally vary with the set encoding direction of a hologram on the spatial light modulation device. In the above-mentioned embodiment of the spatial light modulation device in which the pixel pitch in the horizontal direction and the pixel pitch in the vertical direction are identical or at least similar, a diagonal encoding direction of a hologram, for example using quadratic pixels, produces the result that the pixel pitch in the diagonal direction is greater by a factor of $\sqrt{2}$ (square root of 2) than the pixel pitch in the horizontal direction or in the vertical direction and therefore the extension of a generated diffraction order in the observer plane similarly differs in the diagonal direction from the diffraction order in the horizontal direction or in the vertical direction. It may then be appropriate to choose the diagonally generated virtual observer window also as different compared with the horizontally or vertically generated virtual observer window. Different size requirements apply in the case of a sweet spot in the observer plane, for example due to the extension of the tracking region. If, for example, the horizontal tracking region for the fine tracking, or viewed as a whole in the case of the head-mounted display, is intended to be larger than the vertical tracking region, the extension of the horizontal sweet spot can also be appropriately chosen as larger than that of the vertical sweet spot. The size of a sweet spot can be set, for example, through the number of diffraction orders used or through the scattering angle of a scatter element.

In one particularly preferred embodiment of the invention, it can be provided that the tracking device comprises at least one controllable optical element which is disposed between the at least one illumination device and an observer plane in which an observer of the scene is located.

For a change in the encoding direction of a hologram, the tracking device can comprise at least one controllable or switchable optical element in the beam path between the at least one illumination device which can comprise at least one light source and the observer plane in order to generate a sweet spot or a virtual observer window in a changed direction. The at least one controllable optical element can be disposed upstream or downstream of the spatial light modulation device in the light propagation direction. The at least one controllable optical element can be designed as a scatter element which scatters incident light in one direction only. In this way, a sweet spot can be generated in this defined direction or scatter direction.

In a different advantageous embodiment of the invention, the at least one controllable optical element of the tracking device can be designed as a polarization switch, where the tracking device comprises at least one passive deflection grating element, preferably a polarization grating element, and at least two passive scatter elements which scatter incident light in one direction only, where the passive deflection grating element and the at least two passive scatter elements operate in combination with the polarization switch.

The at least one controllable optical element can be designed as a polarization switch, for example a non-pixelated liquid crystal cell or liquid crystal layer, which functions or acts or operates in combination with the at least two passive scatter elements. By means of a deflection grating element whose deflection angle is controllable in a polarization-selective manner, for example a polarization grating element, and the polarization switch which is controllable by means of an electric field and generates a polarization state of the light depending on the switching state and therefore selects a deflection angle in the deflection grating element, one of the scatter elements can be selected in order to scatter the incident light accordingly. The polarization switch can be disposed in the display device upstream of this deflection grating element in the light propagation direction. The scatter elements in each case then generate a sweet spot in the scatter direction in the observer plane. One-dimensionally designed scatter elements are furthermore provided for this purpose.

The at least two passive scatter elements can be designed as volume gratings, where the at least two passive scatter elements have a different angular selectivity.

The at least two passive scatter elements can be designed, for example, in the manner of a volume grating which has a specific angular selectivity and therefore effectively only scatters light which is incident within a specific angular range. Different angular selectivities, for example, can thus be set for the individual scatter elements. For each passive scatter element, the direction of the incident light for which it efficiently scatters differs from that of the other passive scatter element(s). Precisely two passive scatter elements, for example, could be provided, where one scatter element thereof efficiently scatters the light incident at +30 degrees, whereas the other scatter element efficiently scatters the light incident at −30 degrees.

In the aforementioned embodiment, the at least two passive scatter elements can optionally also have different scatter characteristics, for example can generate different scatter angles. As a result, the size of a sweet spot can then also be set differently for the individual encoding directions of a hologram.

In one alternative embodiment, the tracking device can comprise at least one controllable optical element which is designed as a polarization switch, where the tracking device can comprise at least one redirection element, preferably a polarization beam-splitter element, and at least two passive scatter elements which scatter incident light in each case in one direction only, where one of at least two different light paths is selectable by means of the controllable optical element and the redirection element, and a scatter element is provided in each case in each of the different light paths. In other words, the at least two passive scatter elements are disposed in different paths in the beam path and one of these light paths and therefore one of the scatter elements can be selected by means of the redirection element in combination with the polarization switch.

The polarization, for example, of the light incident on a polarization beam-splitter element is set with a polarization switch. The light emerges straight or deflected at 90 degrees from the polarization beam-splitter element depending on the polarization state. A vertically scattering scatter element is disposed, for example, close to one output of the polarization beam-splitter element, whereas a horizontally scattering scatter element is disposed close to a different output of the polarization beam-splitter element. The light reaches either the one scatter element or the other scatter element depending on the polarization set by means of the polarization switch. In the further course the light paths can be combined by means of a combiner, for example a beam splitter cube, so that the light from both scatter elements is further directed toward the observer plane.

The scatter elements in each case then generate a sweet spot in the scatter direction in the observer plane. One-dimensionally designed scatter elements are provided here also. Scatter elements with different scatter angles can optionally be used here also in order, for example, to generate a differently sized sweet spot for different scatter directions of the light.

In one further embodiment of the invention, it can advantageously be provided that the tracking device comprises a passive scatter element which is designed as rotating.

The tracking device could also comprise only a single passive scatter element which is designed as one-dimensional and mechanically rotating in order to change the scatter direction of the incident light. This means that this passive scatter element would be rotated from a starting position into a final position for a change or a switch process from one encoding direction of a hologram to a different encoding direction of the hologram. When this final position is reached, the passive scatter element remains in its final position during the display of a hologram on the SLM.

A plurality of encoding directions, for example four different encoding directions which correspond to different angles of rotation, for example four different angles of rotation, of the passive scatter element can advantageously be set with a single passive scatter element.

However, in this embodiment, the scatter angle and therefore the size of the sweet spot are identical for all encoding directions.

It can furthermore advantageously be provided that the tracking device comprises at least two controllable optical elements.

At least two controllable optical elements can also be used to change the encoding direction of a hologram. These at least two controllable optical elements can be designed as scatter elements which in each case scatter incident light in one direction only, in fact in each case in a different direction. A first scatter element could scatter, for example, in a direction of approx. 20° vertical×1° horizontal. A second scatter element could then scatter, for example, in a direction of approx. 1° vertical×20° horizontal. By means of a control or a switch between the one scatter element and the other scatter element, the encoding direction of the hologram can thus be rotated through 90° on the spatial light modulation device, where a correspondingly sized sweet spot can be generated perpendicular to the encoding direction of the hologram.

In other words, a first controllable optical element can advantageously scatter incident light in a predefined first direction, where a second controllable optical element can scatter light in a predefined second direction, where the first direction and the second direction are different. The encoding direction of the hologram or subhologram can thus be advantageously definable through corresponding control of the first controllable optical element and the second controllable optical element. Out of at least two controllable optical elements, one would therefore be activated or controlled in each case to scatter light in a desired direction, where the other controllable optical element(s) would be deactivated or not controlled, so that they scatter no light. The controllable optical elements could in turn be designed so that they optionally also generate scatter angles of different sizes in order, for example, to define the size of the sweet spot differently according to the encoding direction of a hologram.

It can furthermore be provided that the at least one controllable optical element comprises two substrates between which a liquid crystal layer is embedded. At least one substrate out of these two substrates of the at least one controllable optical element can preferably have a surface structure.

Two substrates are joined together to produce a controllable optical element, where a space between the two substrates is filled with a liquid crystal layer. Only one substrate of the controllable optical element preferably has a surface structure, where the other substrate can be designed as flat. The surface structure of the at least one substrate can, in particular, be a one-dimensional statistical surface structure which can be impressed into a polymer layer which forms part of the substrate. In this case, "statistical surface structure" means that the surface profile has no regular, repeating pattern, but has random fluctuations within predefined limits, as described in detail below. A scatter characteristic of the controllable optical elements can be predefined through the choice of the surface structure, i.e. its width, its height and a statistical distribution. The surface structure can be designed, for example, similar to a surface relief grating or blazed grating, where, however, in contrast to conventional grating elements, the grating period and/or the blaze angle can vary randomly with the position on the substrate so that no regular diffraction orders are produced, but light is scattered instead over a predefined angular range. In other words, the surface structure can have a grating period which varies randomly with the position on the substrate.

The light scatter angle can then be set, for example, by predefining a minimum and a maximum grating period, and similarly by predefining the frequency of different grating periods and/or the range and distribution of blaze angles. A surface profile can be calculated and a master can then be produced lithographically for the surface structure with these predefinitions, for example using a random number generator via a computer. Impressions can then be created from this master. The surface structure can generally also be an irregular height profile whose width and height are varied randomly with the position on at least one substrate of the controllable optical element.

In a further advantageous embodiment of the invention, it can be provided that the substrates of the at least one controllable optical element in each case comprise an electrode arrangement, where the respective electrode arrangement comprise at least one electrode. The at least one electrode can be designed, for example, as plane, i.e. non-pixelated.

The substrate lying opposite the substrate with the surface structure can advantageously be provided for the alignment of liquid crystals in the liquid crystal layer. This substrate of the at least one controllable optical element can be designed as flat or plane and can be used for an alignment of the liquid crystals in the liquid crystal layer. This can be done, for example, through rubbing or photoalignment.

The liquid crystal material of the liquid crystal layer can further have a first refractive index and a second refractive index, where the first refractive index essentially corresponds to the refractive index of the surface structure, where the second refractive index is essentially different from the refractive index of the surface structure.

The birefringent liquid crystal material of the liquid crystal layer can have a first refractive index, for example the ordinary refractive index, which is essentially identical to the refractive index of the surface structure. The ordinary refractive index or the first refractive index of the liquid crystal material and the refractive index of the surface structure of the at least one controllable optical element are, for example, both n=1.5. The birefringent liquid crystal material can further have a second refractive index, for example the extraordinary refractive index, which differs from the refractive index of the surface structure of the at least one controllable optical element. The extraordinary refractive index or the second refractive index of the liquid crystal material is, for example, n=1.7, where the refractive index of the surface structure is n=1.5.

If a plurality of controllable optical elements are present, in which at least one substrate has a one-dimensional surface structure, it can advantageously be provided that these controllable optical elements are disposed in the beam path in such a way that the one-dimensional surface structures of the individual controllable optical elements provided on at least one substrate in each case have a different orientation in relation to one another.

If a plurality of controllable optical elements, i.e. at least two controllable optical elements, are used in the beam path, these controllable optical elements can be disposed in relation to one another in such a way that the surface structures, preferably the statistical surface structures, on the respective substrates of the individual controllable optical elements in each case have a different orientation in relation to one another.

The surface structures of two controllable optical elements can preferably be disposed at an angle of approx. 90° in relation to one another. In this way, the surface structures of the individual controllable optical elements are similarly preferably disposed at 90° in relation to one another. However, it is, of course, also possible, particularly in the case of more than two controllable optical elements, for the individual controllable optical elements to be disposed at a different angle, such as e.g. 60° or 45°, in relation to one another. If, for example, one controllable optical element would be controlled or if a voltage would be applied to it and a further controllable optical element would not be controlled or no voltage would be applied to it, the incident light would be scattered in a first direction. Conversely, if one controllable optical element would not be controlled or no voltage would be applied to it, but a further controllable optical element would be controlled or a voltage would be applied to it, the incident light would be scattered in a second direction.

The scatter angles of the individual controllable optical elements can in turn be optionally designed as different, so that, along with the direction of the sweet spot, the size of said sweet spot can also be defined differently.

At least one polarization element can further be provided upstream of the at least one controllable optical element in the light propagation direction.

The at least one polarization element can be designed as a polarization grating element and can, for example, deflect incident left-circularly polarized light into a +1st diffraction order and right-circularly polarized light into a −1st diffraction order. However, this is only intended to indicate that differently polarized light can be deflected in different directions by means of the at least one polarization element.

In one particular embodiment of the invention, it can be provided that the tracking device is designed as a filter arrangement which is provided to eliminate diffraction orders.

The invention is generally not intended to be restricted to the use of scatter elements or controllable optical elements, as already explained, for changing the encoding direction of a hologram or subhologram. Instead, it is also possible for the tracking device to be designed as a filter arrangement with which the encoding direction of a hologram or subhologram is changeable on the at least one spatial light modulation device. For this purpose, coherent light can be used equally in all directions, i.e. in the encoding direction and in the non-encoding direction of a hologram or subhologram. In a filter plane between the at least one spatial light modulation device and the observer plane, particularly in a Fourier plane of the spatial light modulation device, unwanted diffraction orders can be filtered out for this purpose. In the encoding direction of the hologram or subhologram, only light of a single diffraction order should reach the eye of an observer, since the observer would otherwise see an unwanted multiple image of the reconstructed scene. Each object point of the preferably three-dimensional scene would be reconstructed once per diffraction order at positions differing for the individual diffraction orders. However, perpendicular to the encoding direction of the hologram or subhologram, i.e. in sweet spot direction, different diffraction orders do not result in interference in the eye of the observer. The observer would in each case see the same reconstructed scene in the individual diffraction orders. The object points of the scene would be generated at the same position in each diffraction order in this sweet spot direction.

The use of a plurality of diffraction orders helps, on the one hand, to increase the region within which the light reaches the eye pupil of the observer. A sweet spot can therefore also be generated by light of a plurality of diffraction orders in the observer plane.

A sweet spot and a virtual observer window can then be generated, for example, by allowing through only one diffraction order by means of the filtering in a Fourier plane of the SLM in one direction which corresponds to the encoding direction of the hologram or subhologram, and by filtering out the other generated diffraction orders, where a plurality of diffraction orders are allowed through in the direction perpendicular thereto which corresponds to the sweet spot direction. If this filter arrangement is designed to be controllable as a tracking device for filtering diffraction orders, it is possible, for example, to switch from one switching state having a single diffraction order in a horizontal direction and a plurality of diffraction orders in a vertical direction to another switching state having a single diffraction order in a vertical direction and a plurality of diffraction orders in a horizontal direction. It can thus be advantageous if the filter arrangement is designed as controllable. In further switching states of the filter arrangement, diagonal diffraction orders, for example, can also be used, e.g. a diffraction order in a +45 degree direction and a plurality of diffraction orders in a −45 degree direction, or vice versa.

This switch or change of the switching states of the filter arrangement can be performed either through mechanical rotation of an aperture in the filter plane or, in a different embodiment, by means of an electrically switchable filter aperture which can be switched back and forth between different orientations of the filter aperture.

The design as a rotating filter aperture allows only the setting of an identically sized sweet spot in the different encoding directions of a hologram.

However, with an electrically controllable filter aperture, different numbers of diffraction orders can be filtered in the sweet spot direction depending on the aperture setting in order to thus generate a differently sized sweet spot depending on the encoding direction of a hologram. Five diffraction orders in the horizontal direction, for example, but seven diffraction orders in the vertical direction can be used for the sweet spot by choosing apertures or openings of different sizes in the filter plane for the horizontal sweet spot and for the vertical sweet spot.

In a different advantageous embodiment of the invention, it can be provided that at least one light source of the at least one illumination device is designed as the tracking device, wherein the at least one light source is designed as controllable in order to modify the coherence property of the light which is to be emitted.

In a different embodiment, the coherence property of the light can already be modified, for example, through control or switch of a light source of the at least one illumination device in such a way that a high coherence for generating a virtual observer window or a low coherence for generating a sweet spot is in each case present in different directions. A high coherence in the encoding direction is understood here to mean a coherence which is sufficient so that the light emanating from different pixels within a subhologram on the SLM interfere with one another. Low coherence in the sweet spot direction means that the light from adjacent pixels of the SLM in the sweet spot direction do not have to interfere with one another. A slot-shaped light source, for example, which has a different coherence in the long direction and in the short direction of the slot can be used for the illumination of the SLM. The complex degree of coherence of a radiation field which is generated by an extended quasi-monochromatic light source can be calculated in a known manner according to the van Cittert-Zernike theorem. Such a slot-shaped light source can, in particular, generate a different angular spectrum in the short direction and in the long direction of the slot in the illumination of the SLM.

The SLM is preferably illuminated in the encoding direction of a hologram with an angular spectrum of $1/60°$ degrees (i.e. one arc minute) or less, since this permits a holographic reconstruction with a resolution which matches or exceeds the resolution of the human eye. In the sweet spot direction, however, the SLM can be illuminated with a significantly greater angular spectrum, for example an angular spectrum of 1-2 degrees. The length and width of the slot-shaped light source and its distance from the SLM can be defined in such a way that these angular spectra are produced on the SLM. If, for example, an imaging element, e.g. a lens, is located between the light source and the SLM, and a light source is located within the focal length of the imaging element on the object side, the light source is imaged to infinity by the imaging element. Light from one point of the light source is then incident in parallel on the SLM. Light from another point of the light source is also incident in parallel, but at a different angle compared to the first point, on the SLM. The angular spectrum is then determined by the extension of the light source and the focal length of the imaging element. Tan $\alpha=x/f$, where x is the extension of the slit or slot and f is the focal length. In the case of an imaging element having a focal length of 100 mm, the short direction, for example, of the slot of the light source would be 29 μm wide in order to generate an angular spectrum of $1/60$ degrees.

The long direction of the slot could be 3.5 mm in length in order to generate an angular spectrum of 2 degrees.

It must also be taken into account that, in a display device for the holographic reconstruction of objects or scenes in which an enlarged image of the SLM visible from the virtual visibility region is generated, the effective angular spectrum decreases with the enlargement. The numerical example of the slot-shaped light source relates here to an unenlarged SLM directly visible from the perspective of the observer. For an SLM imaged in enlarged form, the light source could similarly be greater in proportion to the enlargement factor. If, for example, an SLM is imaged as enlarged by a factor of 10, the SLM can be illuminated with an angular spectrum of $1/6$ degrees×20 degrees, so that the angular spectrum of $1/60$ degrees×2 degrees is incident on the generated image of the SLM. The slot-shaped light source could also be greater by a factor of 10.

In any event, the invention is not intended to be restricted to a slot-shaped light source of exactly this size. The numerical indications merely represent examples and serve as an illustration.

A single slot-shaped light source could, for example, be controlled and rotated from one orientation into another orientation of the short or long direction of the slot if the encoding direction of a hologram or subhologram is intended to be changed. In a different embodiment, a plurality of slot-shaped light sources with different orientation of the long direction of the slot could also be used, one light source of which is switched on and another light source is switched off if the encoding direction of a hologram is intended to be changed.

However, it is also possible for the coherence of the illumination of the at least one spatial light modulation device to be adjusted by means of a controllable optical element so that a high coherence is present in each case in the encoding direction of a hologram and a reduced or low coherence is present in the sweet spot direction. A one-dimensionally designed scatter element, for example, would reduce the coherence in the scatter direction.

The display device according to the invention can preferably be designed as a holographic display device. The display device can be designed, in particular, as a head-mounted display, where the head-mounted display has a display device according to the invention in each case for a left eye of an observer and for a right eye of an observer.

The object according to the invention is further achieved by a method for representing two-dimensional and/or three-dimensional scenes as claimed in claim 28.

The method according to the invention for representing two-dimensional and/or three-dimensional scenes comprises at least one illumination device to emit sufficiently coherent light, at least one spatial light modulation device, at least one optical system, a tracking device and a position detection system. The position detection system determines a position of an eye of an observer. A suitable encoding direction of a hologram for object points of the scene on the at least one spatial light modulation device is determined with the at least one optical system and the tracking device. The hologram represents the sum of all subholograms, where a subhologram is assigned to each object point of the scene to be represented. A change in the encoding direction of the hologram means that the encoding direction also changes for each individual subhologram.

A hologram is encoded in the determined encoding direction into the at least one spatial light modulation device by means of a single-parallax encoding. The at least one spatial light modulation device is illuminated by the at least one illumination device and the hologram is reconstructed by means of the at least one optical system. At least one virtual visibility region is generated at the position of the eye of an observer.

In this way, a generated virtual visibility region can track the eye of the observer in a suitable manner, with simple means and at low cost by changing the encoding direction of the hologram which is to be encoded into the at least one spatial light modulation device.

The encoding direction in which the virtual visibility region has the largest proportional area of overlap with an eye pupil of the observer can advantageously be chosen for the hologram to be encoded.

The encoding direction which provides the largest proportional area of the virtual visibility region within the eye pupil of the observer is in each case selected. If a plurality of possibilities for a suitable encoding direction having an equally large proportional area of overlap with the eye pupil occur, one of these encoding directions can be selected.

It can be provided that the eye position of the observer and, in particular, the position and possibly the size of the eye pupil and, if the eye position of the observer changes, the new eye position can be determined with the position detection system, the virtual visibility region is rotated around its fixed center point in order to select a suitable encoding direction for the hologram to be encoded, and the direction in which the virtual visibility region has the largest proportional area of overlap with the area of the eye pupil of the observer is determined.

The center point of the virtual visibility region is not changed in order to define a suitable encoding direction of a hologram, but always remains at one and the same position. This means that the virtual visibility region is not shifted to a different position in order to track the virtual visibility region to a new position of the eye, in particular the eye pupil, but always remains with its center point at the same position and is only rotated around its center point.

This furthermore means that the hologram on the at least one spatial light modulation device is also rotated around its center point and a suitable encoding direction is chosen therefrom, since the hologram is encoded by means of single-parallax encoding. This is based on the fact that the subhologram or hologram to be encoded for the object point to be generated is determined by means of a projection of the virtual observer window from the virtual visibility region through an object point of the scene to be reconstructed onto the at least one spatial light modulation device, as shown in FIG. 1.

There are now various possibilities for designing the teaching of the present invention in an advantageous manner and/or for combining the described example embodiments or configurations with one another. For this purpose, on the one hand, reference can be made to the patent claims subordinate to the independent patent claims and, on the other hand, to the following explanation of the preferred example embodiments of the invention with reference to the drawings in which preferred embodiments of the teaching are generally also explained. The invention is explained in outline on the basis of the described example embodiments, but is not intended to be restricted thereto.

BRIEF DESCRIPTION OF THE DRAWINGS

In the figures show.

It should be briefly mentioned that the same elements/parts/components also have the same reference numbers in the figures.

DETAILED DESCRIPTION OF THE INVENTION

Figure 1:
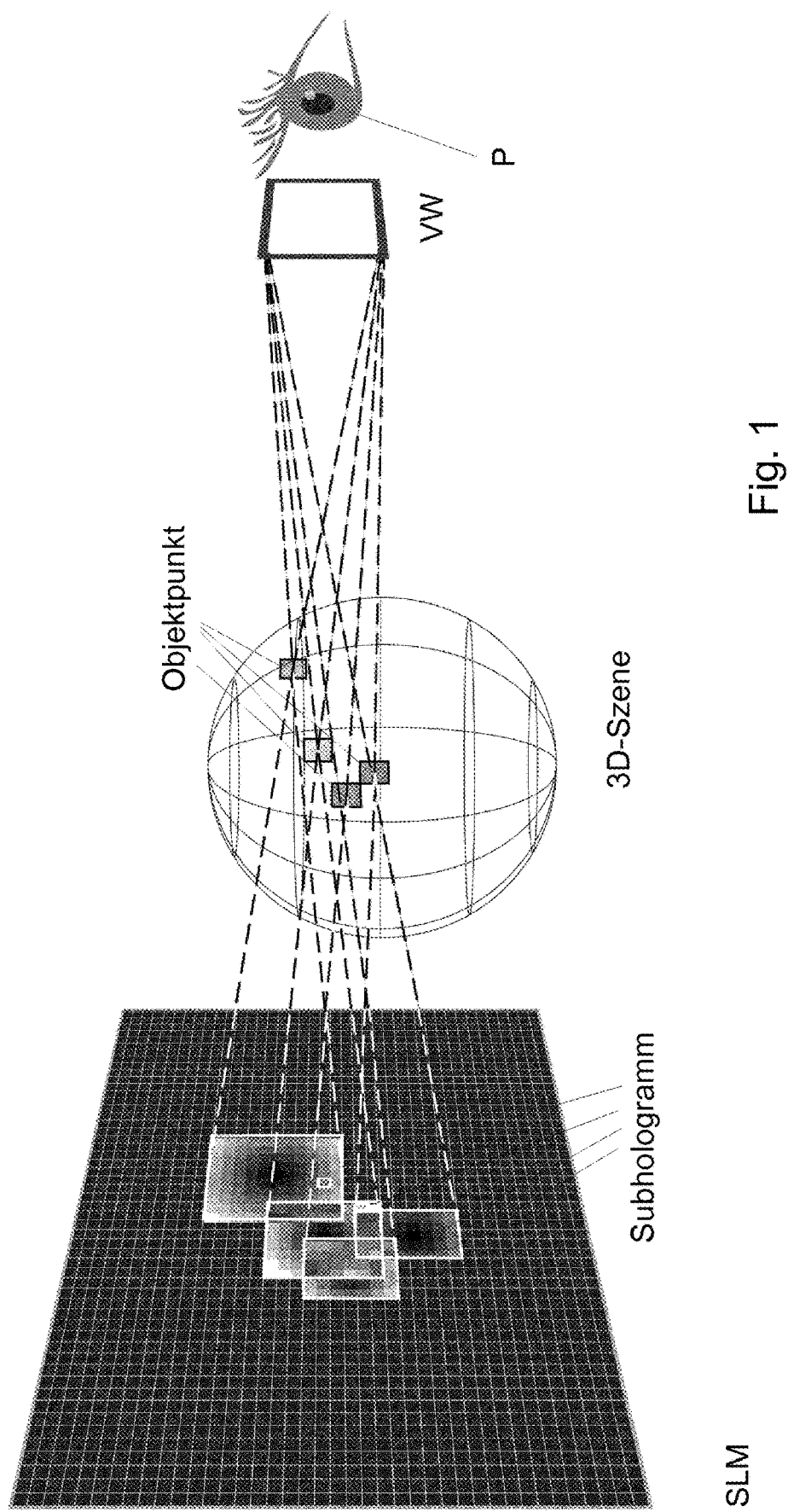
FIG. 1: a schematic representation of a holographic display device according to the invention in a perspective view.

FIG. 1 shows a holographic display device in a perspective view and simplified without the representation of an illumination device and an optical system. Such a display device is intended to serve to illustrate and explain the present invention and will therefore be briefly described once more. In this display device, subholograms are generated for a multiplicity of object points of a scene in different depths in relation to a spatial light modulation device as a projection of a virtual observer window VW in an observer plane in which an observer is located and which is intended to be represented here by the representation of an eye with a pupil P, via the respective object point onto the spatial light modulation device SLM, which will be referred to below for the sake of simplicity as SLM. It can be seen that the position of the subholograms on the SLM is dependent on the position of the object points in relation to the virtual observer window VW. The dimension or extension or size of the subholograms is further dependent on the z-position of the encoded object point, where z is the distance between the object point and the SLM. An overlap of subholograms occurs in most cases.

Object points which are located at a distance far away from the entrance pupil of an eye of an observer, i.e. are located, for example, near to the plane of the SLM or also, in the case of a head-mounted display (HMD) or a head-up display (HUD), near to a virtual plane of the SLM, have a subhologram which is small in terms of its size or extension. In the case of a one-dimensional (1D) encoding of a hologram, for example, also referred to as single-parallax encoding, small subholograms can have a lateral extension of 10 pixels or, in the case of a two-dimensional (2D) encoding of a hologram, also referred to as full-parallax encoding, a lateral extension of 10×10 pixels.

For a holographic reconstruction of scenes, preferably three-dimensional scenes, subholograms are used in conjunction with a virtual visibility region which, in the case of a single-parallax encoding of a hologram, is formed from a virtual observer window in the encoding direction of the hologram and a sweet spot in the non-encoding direction of the hologram or, in the case of a full-parallax encoding of a hologram, is formed from a two-dimensional virtual observer window through which an observer can observe the reconstructed scene.

The projection method according to FIG. 1, for example, can be used to calculate and generate holograms.

In the projection method, the outlines of a virtual visibility region in an observer plane are projected through an object point onto an SLM and generate a subhologram on the SLM. In other words, outlines of a subhologram are formed or generated on the SLM through the projection of the outlines of the virtual visibility region. The phase function which is intended to reconstruct the object point is then encoded in the subhologram. In the simplest design, the amplitude function, or simply the amplitude, in the subhologram is set to the same value for all pixels of the subhologram and is chosen in such a way that the subhologram reconstructs the object point with a predefined intensity. The virtual visibility region in the observer plane is limited in its size to one diffraction order of the resulting diffraction image. Other diffraction orders are not visible to the observer in the virtual visibility region due to this restriction of the virtual visibility region to one diffraction order.

A hologram which reconstructs a two-dimensional and/or three-dimensional scene visible from the virtual visibility region is thus generated.

In terms of head-mounted displays (HMDs), head-up displays (HUDs) or projection displays with a real or virtual image of the SLM, the term "SLM" used here is intended to refer to the image of the SLM which is visible from the virtual visibility region.

In the projection method, the amplitude of a subhologram is constant over the extension of the subhologram in the simplest design. However, designs can also be provided in which this amplitude is changeable over the extension of the subhologram. This can be done, for example, through multiplication by the reciprocal of the Fourier transform of the pixel transmission in order to obtain a more even brightness distribution in the virtual visibility region.

A virtual observer window in an observer plane which can be generated by means of the display device according to FIG. 1 can have an extension which is either smaller than an eye pupil of an observer or is optionally greater than or equal to an eye pupil. However, the virtual observer window should typically not be greater than approx. 10 mm or at most approx. 15 mm, as strict requirements would otherwise have to be imposed on the pixel pitch and the number of pixels of an SLM.

However, with the same SLM which generates the virtual observer window, i.e. with a specific or defined pixel pitch and a specific number of pixels of the SLM, it is possible to generate a sweet spot in the observer plane which can be significantly greater in its extension than a virtual observer window. A sweet spot can, for example, also have an extension of approx. 20 mm or more. The eye distance of an observer constitutes a limitation of the extension for the sweet spot in a direct-view display. Light for the sweet spot of one eye should therefore be prevented from striking the adjacent eye of the observer. Since both eyes of an observer are located horizontally next to one another, this therefore essentially relates only to the horizontal extension of the sweet spot. A vertically generated sweet spot could therefore also be chosen, for example, as having an extension greater than the eye distance. For a head-mounted display, the size of the extension of the sweet spot is advantageously chosen so that the region of the sweet spot can cover the typical range of movement of the pupil within the eye.

The invention will now be explained in example embodiments with reference to FIGS. 3 to 10 based on the example of a holographic head-mounted display (HMD) as a display device according to the invention. A tracking of a virtual visibility region previously carried out by the applicant will be explained with reference to FIG. 2 to provide a clearer understanding of the present invention.

In a head-mounted display of the applicant in which the individual holograms or subholograms are encoded into the SLM for the individual objects points of a scene by means of a single-parallax encoding, only a very small virtual observer window of approx. 1 mm and a sweet spot of approx. 10 mm are mostly used, together forming the virtual visibility region in the observer plane. As a whole, this then produces a rectangular virtual visibility region with edge lengths or extensions which are substantially different in two directions, within which a reconstruction of the two-dimensional or three-dimensional scene is visible to the eye pupil of an observer.

Figure 2:
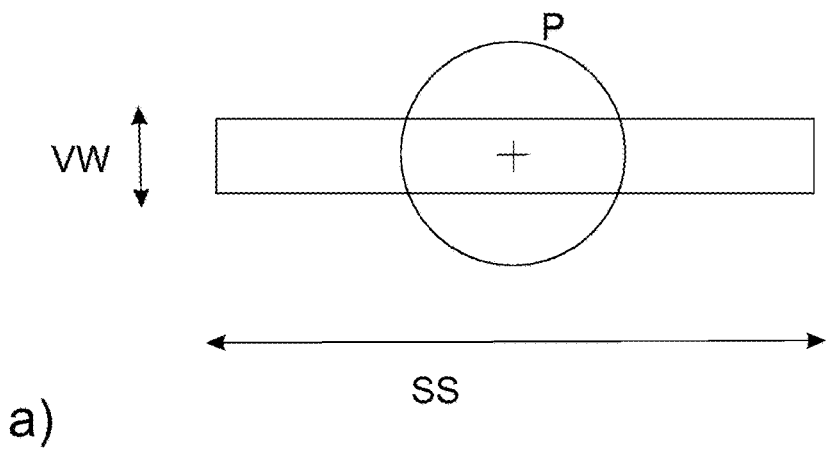
FIG. 2: schematic representations of a virtual visibility region in relation to an eye area of an observer according to the prior art.
Figure 2:
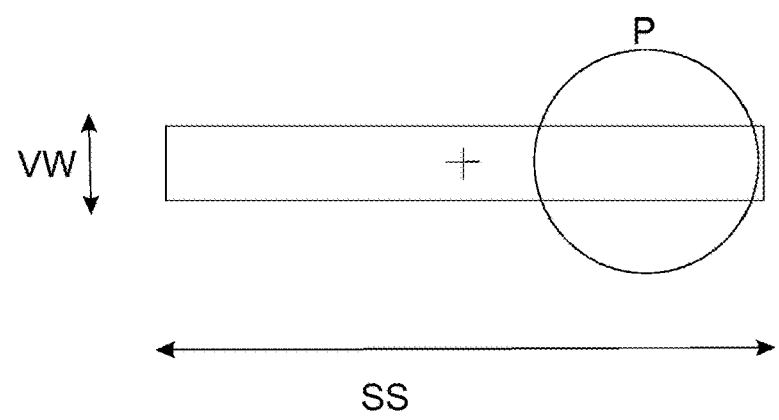
Figure 2:
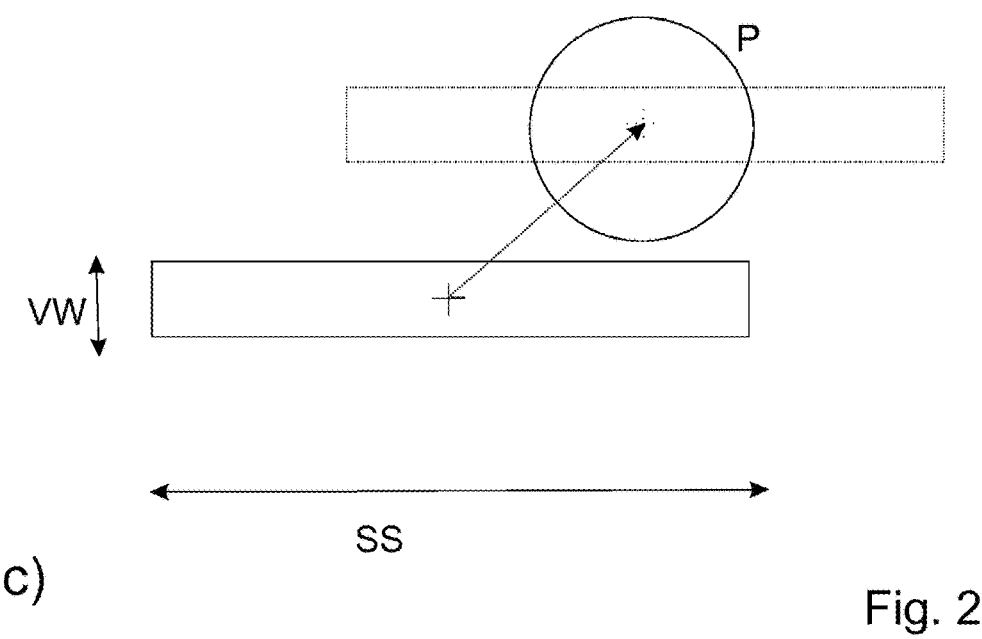

FIG. 2 shows a generated virtual visibility region according to the prior art which is formed from a virtual observer window VW and a sweet spot SS. Such a virtual visibility region is generated in a single-parallax encoding of a hologram into an SLM, where the encoded hologram or subhologram has a fixed encoding direction, here, in this case, a vertical encoding direction. A virtual observer window VW which is small in its extension is thereby produced in the vertical direction. In FIG. 2, the extension of the virtual observer window VW is less than the size of the pupil P of the eye of an observer. As can be seen, a sweet spot SS having an extension which is significantly greater than the extension of the virtual observer window VW is generated here in the horizontal direction.

In illustration a) in FIG. 2, a position of a pupil P of an eye of an observer is shown in the central region of the virtual visibility region. This means that the pupil P of the eye is located in each case in the central region of the virtual observer window VW and also in the central region of the sweet spot SS. In this position of the pupil P in relation to the virtual visibility region, the eye of the observer can perceive and observe a reconstructed, preferably three-dimensional, scene.

Illustration b) in FIG. 2, shows the case where the pupil P of the eye of the observer has moved horizontally in relation to the center of the virtual visibility region, in particular in relation to the center of the sweet spot SS present here in the horizontal direction. However, the pupil P of the eye is still located within the sweet spot SS of the virtual visibility region. In this case also, a reconstruction of the preferably three-dimensional scene is visible to and observable by the eye of the observer.

In illustration c) in FIG. 2, in comparison with illustration b), the case is shown where, in addition to a horizontal movement, the pupil P of the eye of the observer has also moved in a vertical direction in relation to the center of the virtual visibility region. As can be seen, the pupil P of the eye is now located outside the virtual visibility region, i.e. the virtual visibility region and the pupil P of the eye no longer overlay or overlap one another. The observer can now no longer observe the reconstructed scene. In a conventional display device according to the prior art, the virtual visibility region would now have to be shifted with suitable optical means, such as, for example, a diffraction device, and would have to be tracked to a new position of the pupil P of the eye. A virtual visibility region shifted in this way to the new position of the pupil P of the eye is indicated by dashed lines in illustration c).

Figure 3:
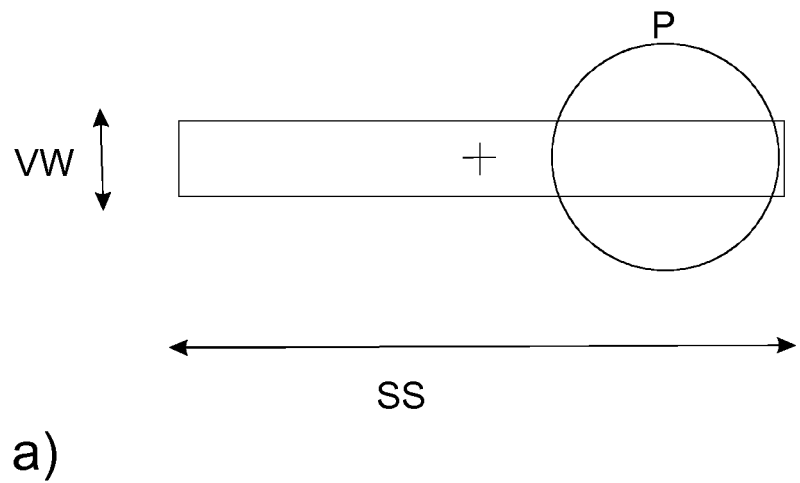
FIG. 3: schematic representations of an embodiment according to the invention for tracking a virtual visibility region.
Figure 3:
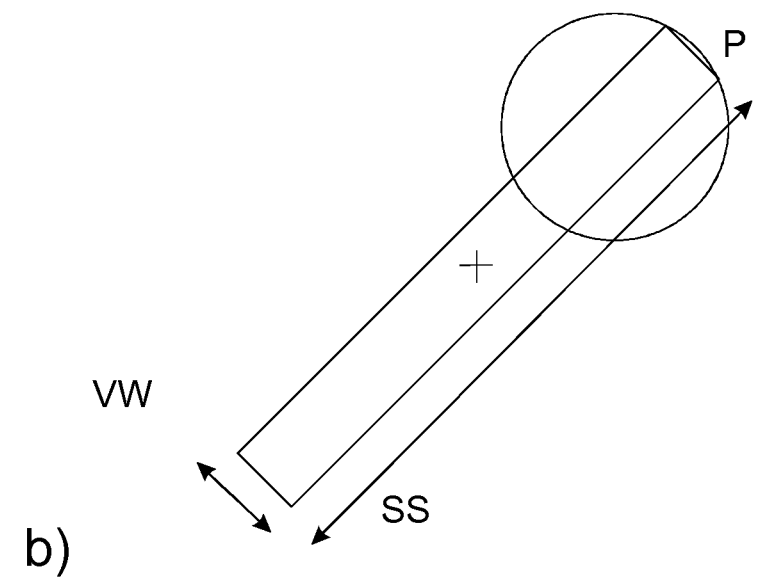

In comparison with FIG. 2, FIG. 3 shows a generated virtual visibility region in the observer plane in which an eye of an observer is located, where the direction of the virtual observer window and the direction of the sweet spot can be changed according to the invention. Here also, a hologram or subhologram is again encoded into the SLM by means of a single-parallax encoding. The encoding direction of the hologram or subhologram on the SLM can therefore be changed as a result. As mentioned in connection with FIG. 2, such a virtual visibility region is generated with a single-parallax encoding of a hologram into an SLM, where the encoded hologram or subhologram has a fixed encoding direction, here, in this case, a vertical encoding direction. As a result, a virtual observer window VW which is small in its extension is produced in the vertical direction. Here also, in FIG. 3, for the sake of simplicity and in order to remain with the example from FIG. 2, the extension of the virtual observer window VW is less than the size of the pupil P of the eye of an observer. As can be seen, a sweet spot SS which is significantly greater in its extension than the extension of the virtual observer window VW is generated here in the horizontal direction.

In illustration a) in FIG. 3, a position of a pupil P of an eye of an observer is shown for which a vertical encoding direction of a hologram or subhologram is used. The position of the eye and, in particular, the eye pupil of the observer in relation to the SLM is determined by means of a position detection system in order to determine a suitable encoding direction of the hologram to be coded into the SLM. A suitable encoding direction of the hologram is then determined by means of an optical system of the display device and a tracking device which are shown e.g. in more detail in FIG. 5, whereby a hologram is encoded into the SLM by means of single-parallax encoding using simulation, and a virtual visibility region is generated in simulated form. It is then determined whether the virtual visibility region overlays the eye pupil of the observer. If so, it can furthermore be verified whether the simulated virtual visibility region has the largest proportional region of overlap with the pupil of the eye of the observer in this encoding direction of the hologram. Similarly if so, the hologram can now be encoded into the SLM in this determined encoding direction and the object point can be reconstructed through illumination of the SLM with an illumination device and of the optical system, so that the observer can observe said object point through the really generated virtual visibility region.

If the eye or the pupil of the eye moves while observing the object point or the scene, the virtual visibility region must track the pupil so that the observer can continue to view the represented object point or the represented scene. A tracking of the virtual visibility region is shown in illustration b) in FIG. 3. A changed position of the pupil P of the eye in comparison with illustration a) is shown there. The eye or the pupil P has moved vertically so that the virtual visibility region from illustration a) no longer overlays the pupil P. The virtual visibility region is now tracked to the new position of the pupil of the eye through a rotation of the virtual visibility region around its center point M. The encoding direction of the hologram on the SLM is thereby similarly changed.

The encoding direction of the hologram is thus determined once more through a simulation, i.e. through rotation of the virtual visibility region generated in simulated form around its center point M. The encoding direction of the hologram in which the largest proportional region of the virtual visibility region overlaps or overlays the pupil of the eye is selected as suitable. If a encoding direction of the hologram is chosen as suitable, the hologram can be encoded into the SLM with this chosen and determined encoding direction. In this way, a virtual visibility region is now generated in the observer plane which overlays the new position of the pupil of the eye. The virtual observer window and the sweet spot are again located partially within the pupil through rotation of the virtual visibility region and consequently through rotation of the encoding direction so that the observer can observe the reconstructed scene without interference.

In comparison with FIG. 2, during the tracking of the virtual visibility region according to FIG. 3, the center point M of the rectangular area of the virtual visibility region which is formed by the virtual observer window and the sweet spot remains at the same position even after the tracking of the virtual visibility region to a new position of the eye or the pupil of the eye. The center point M of the virtual visibility region is therefore not shifted during the tracking.

Depending on the required range of pupil positions, it is not necessary to select the angle of rotation of the virtual visibility region and therefore of the encoding direction in any given small steps, since the pupil, for example if the display device is used as a head-mounted display, cannot move over a large region, as would be the case, for example, with a direct-view display, during the movement of an observer if said observer moves to a different position. The change in the encoding direction of a hologram for tracking a virtual visibility region is also not provided for large movements of an observer, but is instead particularly advantageously suitable for a fine tracking of the virtual visibility region, as can be used, for example, in the case of a head-mounted display. Since the pupil of an eye can move over a limited region only, a small number of rotation angle settings will suffice, for example four rotation angles, e.g. horizontal (0°), vertical (90°) and two diagonal rotation angle settings (+45° and −45°).

Figure 4:
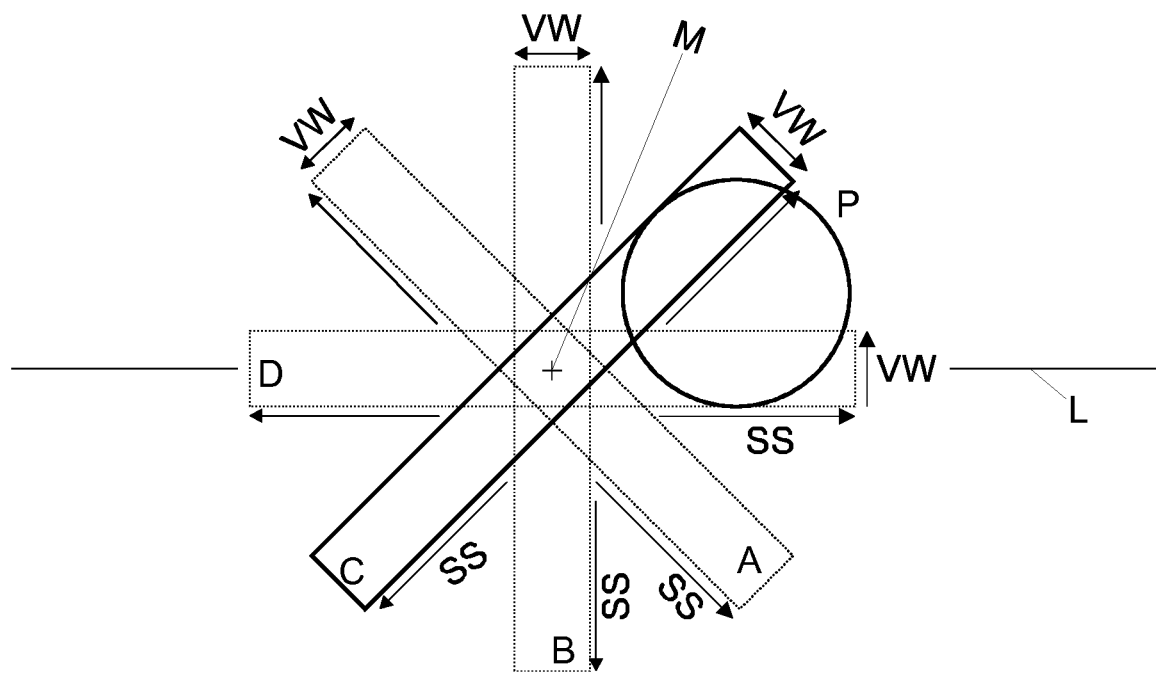
FIG. 4: a schematic representation for determining a suitable encoding direction of a hologram.

FIG. 4 presents schematically an arrangement which shows, in different rotation angle settings, the virtual visibility region which has a virtual observer window with an extension of approx. 1 mm and a sweet spot with an extension of approx. 10 mm. The virtual visibility region is shown here in four possible rotation angle settings, i.e. where the encoding directions of a hologram are located in the horizontal direction (B), in the vertical direction (D) and in two diagonal directions (A and C). The rotation angle which has the largest proportional region of overlap of the virtual observer window VW and the sweet spot SS with the pupil P of the eye is chosen in order to select and determine a suitable encoding direction for the hologram which is to be encoded into the SLM. If a plurality of possible encoding directions having an equally large region of overlap of the virtual visibility region with the pupil P of the eye occur during the determination of a suitable encoding direction for the hologram, one of these encoding directions can be chosen and used.

In FIG. 4, the center or center point of the pupil P of the eye is provided at an angle of approx. 22.5 degrees in relation to a horizontal line L or to the center point M of the virtual visibility region. As can be seen, the vertical encoding direction (D) and the diagonal encoding direction (−45°; C) have the same region of overlap with the pupil P of the eye so that, in the case of encoding of holograms or subholograms with these two encoding directions into the SLM in the representation of the reconstructed object point or scene, the same amount of light passes through the pupil P into the eye of the observer. One of these two encoding directions can therefore be chosen for the hologram or subhologram to be coded into the SLM.

In principle, a change in the encoding direction of a hologram through a rotation of the one-dimensional hologram is also combinable with a shift of the virtual observer window in the encoding direction through encoding of prism terms in the hologram or subhologram, as disclosed in WO 2018/037077A2, the disclosure content of which is intended to be incorporated here in its entirety. If a linear phase function (i.e. a prism function) is added to the phase of the hologram, the virtual observer window is shifted by fractions of a diffraction order. A linear phase function with a difference of $\pi$ between adjacent pixels results, for example, in a shift of the virtual observer window by half ($\frac{1}{2}$) a diffraction order or generally a difference of $2\pi/x$ results in a shift of 1/x of a diffraction order. However, the brightness distribution of the individual diffraction orders is not changed by this shift of the virtual observer window due to phase functions in the hologram. A observer normally sees a correct reconstruction of the preferably three-dimensional scene, but the brightness of said scene decreases if the observer moves away from the central diffraction order into higher diffraction orders. Due to this brightness restriction, the shift of the virtual observer window through encoding of prism terms is normally applicable over only a small region of a few diffraction orders.

If the virtual observer window is smaller in its size than the eye pupil, it should furthermore be ensured through a filtering of diffraction orders in an optical system with an intermediate image of the virtual observer window that only light from the extension of one diffraction order reaches the eye. If, for example, the virtual observer window is unshifted, a filtering would only allow light from the zeroth diffraction order through to the eye. If the virtual observer window is shifted, for example, through prism functions by half a diffraction order, the filtering should allow through half of the zeroth diffraction order and half of the first diffraction order so that this light can reach the eye. This means that the filter aperture should be designed as shiftable according to the prism functions that are used, for example mechanically or through electronic control. Such a use of a filter aperture is possible in combination with all embodiments of the invention. In the embodiment, if a rotatable filter aperture is used in any case in a Fourier plane to set or modify the encoding direction of the hologram also, a combination is possible in the simplest manner by designing the same filter aperture as both rotatable and shiftable.

However, a filtering is not absolutely necessary if the virtual observer window is larger in size than the eye pupil of an observer, since it is then guaranteed, even without filtering, that only light from the extension of one diffraction order reaches the eye. However, the example embodiment shown in FIG. 4 relates to a virtual observer window which is smaller in size than an eye pupil. An approx. 1 mm large virtual observer window with an approx. 10 mm large sweet spot could, for example, still be shifted by a ±1st diffraction order, i.e. by ±1 mm, in the encoding direction of a hologram in order to cover a possible region of approx. 3 mm×10 mm.

In addition to a rotation of the encoding direction of a hologram or subhologram, a small shift of the virtual visibility region by a small region, for example plus/minus one diffraction order, can therefore take place in order to better strike or overlay or overlap the pupil of the eye. Combinations of a rotation of the encoding direction and a small shift could therefore also be taken into account in selecting the encoding direction of a hologram which offers the best overlay with the pupil P of the eye.

Here, as in the previously described cases also which relate only to the rotation of the encoding direction, an allocation of the encoding direction for the individual eye positions can either be recalculated in each case or can be precalculated once in advance for all relevant eye positions and can be stored, for example, in the form of a lookup table. In the latter case, depending on the position of the eye pupil detected with the position detection system, the encoding direction for a hologram which is stored for this position in the lookup table would therefore be chosen. If necessary, the shift of the virtual observer window by means of prism terms which are similarly stored in a lookup table can additionally take place.

Figure 5:
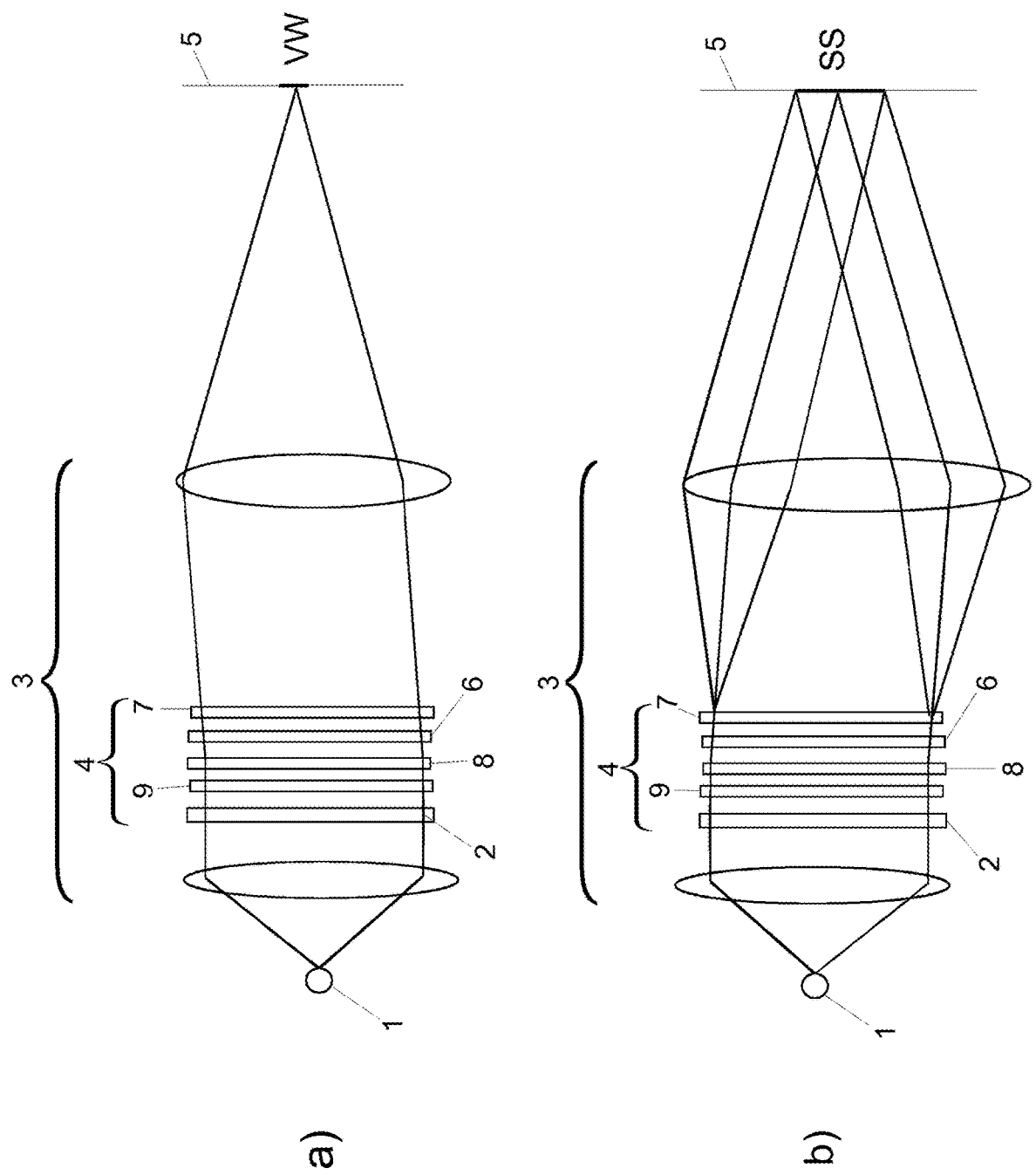
FIG. 5: a schematic representation of a display device according to the invention with which the encoding direction of a hologram is changeable.

FIG. 5 shows a display device, in particular a holographic display device. The display device comprises a tracking device 4 by means of which the encoding direction of a hologram can be modified.

A sweet spot can be generated in an observer plane by means of a scatter element if this scatter element is disposed near to an SLM or in an intermediate image plane of an SLM.

It should be taken into account that, in a display device for the holographic reconstruction of objects or scenes in which an enlarged image of the SLM visible from the virtual visibility region is generated, the scatter element is similarly imaged in enlarged form and the effective scattering angle decreases with the enlargement. In the case of an imaging of the SLM enlarged by a factor of 20, a scatter element with a scattering angle of approx. 20°×1° generates, for example, an effective scattering angle of approx. 1°×$\frac{1}{20}$°. If an image of an SLM is generated at a distance of 1 m from the virtual visibility region, a sweet spot is generated, for example, in the observer plane with an extension of approx. 17 mm with the effective scattering angle of 1° according to the formula tan 1°*1000 mm.

In this example, as a result of the angle of 1/20° in the encoding direction, the resolution of the preferably three-dimensional scene is similarly restricted to 20 pixels/degree in the encoding direction, and is therefore inferior to the maximum visible resolution for an eye. However, the numerical values again represent examples only. A scatter element with a scattering angle of 20 degrees×0.3 degrees could also be used.

In order to provide a tracking of the virtual visibility region to a new position of the pupil of an eye according to FIGS. 3 and 4, a plurality of controllable optical elements, for example, which are designed as scatter elements can be used to modify the encoding direction of the hologram or subhologram and therefore also to modify the sweet spot direction. A first controllable optical element would scatter the light, for example, approx. 20° vertically×1° horizontally, where a second controllable optical element would scatter the light approx. 1° vertically×20° horizontally. By controlling one controllable optical element and then the other controllable optical element, the encoding direction of the hologram or subhologram can be rotated through 90° and a correspondingly large sweet spot can be generated in each case perpendicular to the encoding direction.

This arrangement can optionally be extended as follows: a third controllable optical element would scatter the light, for example, approx. 1° in the direction +45 degrees diagonally and 20° in the direction −45° diagonally. A fourth controllable optical element would scatter the light, for example, approx. 1° in the direction −45 degrees diagonally and 20° in the direction +45° diagonally. In this case, a choice could be made from four encoding directions through control in each case of one of the controllable optical elements.

However, at least two passive scatter elements can also be provided in the tracking device for a tracking of a virtual visibility region to a new position of the pupil of an eye of an observer. These at least two passive scatter elements can be selected by means of at least one controllable optical element of the tracking device for the light scattering.

The at least two passive scatter elements can be designed, for example, as volume gratings and can have a specific angular selectivity for this purpose. In this case, different angular selectivities can be set for the individual scatter elements designed as volume gratings.

A deflection grating element and a controllable optical element can be provided in order to select or provide one of the at least two passive scatter elements for a light scattering. The deflection grating element has, for example, a deflection angle which is controllable or switchable for polarization selection purposes. The deflection grating element could, for example, be a polarization grating element which, for left-circular or right-circular polarized incident light, deflects this light into either the +1st or −1st diffraction order, where each diffraction order corresponds to a different deflection angle. The controllable optical element can be designed as a polarization switch, for example an LC (liquid crystal) layer which is controllable by means of an electric field. The controllable optical element in the form of the polarization switch generates a defined polarization state of the light according to the switching state of the polarization switch, for example in one switching state left-circular polarized light and in another switching state right-circular polarized light. In this way, a deflection angle can therefore be selected in the deflection grating element and one of the passive scatter elements of the tracking device can be selected on the basis of the angular selectivity of the scatter elements.

A display device with such a tracking device is shown in FIG. 5. The display device comprises an illumination device 1 with at least one light source, an SLM 2, an optical system 3 and the tracking device 4, where further optical elements or devices in the display device are possible, but are not necessary to explain the invention. A hologram or subhologram is intended to be encoded in the SLM by means of a single-parallax encoding in order to reconstruct or represent a scene for an observer. The SLM is illuminated by the illumination device 1 with sufficiently coherent light. The optical system 3 which comprises, for example, at least one imaging element, such as a lens element, is disposed between the SLM 2 and an observer plane 5. The arrangement of the optical system 3 in the beam path is provided in such a way that, in the absence of the tracking device 4, it would image the light of the illumination device 1 in the non-encoding direction, i.e. the sweet spot direction, into the observer plane 5. The optical system 3 additionally generates an enlarged virtual image (not shown here) of the SLM 2 visible from the observer plane 5.

The tracking device 4 comprises two passive one-dimensional scatter elements 6 and 7 which are disposed downstream of the SLM 2 in the light propagation direction. A first scatter element 6 generates a scattering angle of 20° in the vertical direction and a scattering angle of 1° in the horizontal direction. A second scatter element 7 generates a scattering angle here of 1° in the vertical direction and a scattering angle of 20° in the horizontal direction. The two passive one-dimensional scatter elements can be designed here as volume gratings and have a restricted angular acceptance typical of volume gratings. The angular acceptance ranges of the two passive one-dimensional scatter elements differ from one another so that a passive, one-dimensional scatter element 6 or 7 can be selected on the basis of a defined light incidence angle, the incident light then being scattered accordingly by said scatter element.

The tracking device 4 further comprises a deflection grating element 8, here in the form of a polarization grating element, which is disposed between the passive one-dimensional scatter element 6 and the SLM 2. The deflection grating element 8 correspondingly deflects light which is polarized in a defined manner. The deflection grating element 8 deflects, for example, incident left-circular polarized light into a +1st diffraction order and incident right-circular polarized light into a −1st diffraction order. A specific one-dimensional scatter element 6 or 7 can thereby be selected and the light can be directed onto it, said light then being scattered accordingly.

The tracking device 4 further comprises a controllable optical element 9 which is designed here as a polarization switch. The controllable optical element 9 is disposed between the deflection grating element 8 and the SLM 2 in the beam path of the display device. The controllable optical element 9 in the form of the polarization switch can be controlled in order to generate a defined polarization state of the light. The controllable optical element 9 generates, for example, either left-circular polarized light or right-circular polarized light depending on its switching state. A selection is therefore made by means of the controllable optical element 9 to determine whether the deflection grating element 8 deflects the light into the +1st diffraction order or the −1st diffraction order. The passive one-dimensional scatter elements 6 and 7 are designed as volume gratings in such a way that the deflection angle of the +1st diffraction order of the deflection grating element 8 falls within the angular acceptance range of one of the passive one-dimensional scatter elements 6 or 7 and the deflection angle of the −1st deflection order of the deflection grating element 8 falls within the angular acceptance range of the other passive one-dimensional scatter element 6 or 7.

By means of the switching state of the controllable optical element 9 or of the polarization switch and by means of the deflection grating element 8, one of the two passive one-dimensional scatter elements 6 or 7 is thus selected which in each case scatters the incident light, whereas the other passive one-dimensional unselected scatter element 6 or 7 has light passing through it at angles outside its acceptance range, as a result of which the light is not scattered.

FIG. 5 shows the control or selection of the passive one-dimensional scatter element 6 in a first control state or switching state of the controllable optical element 9 in illustration a), where, in illustration b), the control or the selection of the passive one-dimensional scatter element 6 is shown in a second control state or switching state of the controllable optical element 9. In order to encode the hologram or subhologram into the SLM 2 with a suitable encoding direction by means of a single-parallax encoding, simulations of the generation of the virtual visibility region are necessary in advance in order to determine a suitable encoding direction for the hologram which is to be encoded. The procedure as shown in illustrations a) and b) is then performed here and the direction in which the virtual visibility region has the largest region of overlap with the eye or the pupil of the eye of the observer is determined by means of the tracking device 4 through rotation of the virtual visibility region around its center point according to FIGS. 3 and 4. The encoding direction with which the hologram or subhologram is then encoded into the SLM 2 is thereby determined so that the observer can observe the represented object point or scene without interference even if the eye or the pupil of the eye moves to a different position.

The controllable optical element 9 is set to a first control state in illustration a) in FIG. 5 in order to simulate the virtual visibility region and thus determine a suitable encoding direction, as a result of which the passive one-dimensional scatter element 6 which is first in the light direction is selected for the light scattering. In this case, a virtual visibility region is generated in the observer plane 5, where a generated virtual observer window VW is produced in the drawing plane of the represented FIG. 5 and a sweet spot SS is generated perpendicular to the drawing plane.

In illustration b) in FIG. 5, the controllable optical element 9 is set to a second control state, as a result of which the second, passive one-dimensional scatter element 7 following the first, passive two-dimensional scatter element 7 is selected for the light scattering. In this case, a virtual visibility region is generated in the observer plane 5, where a generated virtual observer window VW is now generated perpendicular to the drawing plane of FIG. 5 and a sweet spot SS is now generated in the drawing plane. In this way, the directions of the virtual observer window VW and of the sweet spot SS in the observer plane 5 can thus be modified through rotation around their center point, so that the encoding direction of the hologram is consequently also changed as a result due to the projection of the virtual observer window onto the SLM 2 in order to determine the size or extension of the hologram or subhologram.

This arrangement can be extended to four angular setting directions, i.e. horizontal, vertical and two diagonal angular settings of the encoding direction of a hologram or subhologram, through the use of a further controllable optical element, a further deflection grating element and two further passive one-dimensional scatter elements in the tracking device 4. A first controllable optical element 9 and a first deflection grating element 8 then generate two possible deflection angles, according to the control state of the first controllable optical element 9. A second controllable optical element can then, for example, set the polarization of the light in such a way that a second deflection grating element whose grating period differs from that of the first deflection grating element 8 in turn deflects into either a +1st diffraction order or a −1st diffraction order. This produces a total of four possible deflection angles, combinations of the +1st diffraction order or −1st diffraction order of the first deflection grating element with the +1st diffraction order or −1st diffraction order of the second deflection grating element. The four passive one-dimensional scatter elements can be designed in each case as volume gratings which have four different angular acceptance ranges which correspond in each case to one of the four deflection angles of the arrangement of controllable optical elements and deflection grating elements.

Further optical elements of this type can be provided in the tracking device if further angle directions of the encoding direction are required for the hologram which is to be encoded.

It is also possible for the tracking device to have at least one redirection element instead of the deflection grating element, such as, for example, a polarization beam-splitter element in order to select different paths in the light path by changing the polarization of the light, where the paths in each case have a one-dimensional passive scatter element. The scatter elements in the individual paths should be aligned differently for this purpose. One passive scatter element, for example, could scatter the light in a horizontal direction in a first path at one output of the polarization beam-splitter element, where another passive scatter element scatters the light in the vertical direction in a second path at another output of the polarization beam-splitter element. In this case, the scatter elements do not have to be designed as angle-selective. The number of paths and passive scatter elements can also be extended here to a number of four by means of a second controllable optical element and a second polarization beam-splitter element.

Instead of the deflection grating element, the controllable optical element and the two passive scatter elements, the tracking device 4 of the display device according to FIG. 5 could, for example, also comprise only a single passive scatter element which is designed as mechanically rotating in order to modify the scatter direction of the incident light. The passive scatter element is designed here as one-dimensional. The single passive scatter element scatters, for example, in one direction at 20° and in a direction perpendicular thereto at 1°, where the 20° direction can be modified by rotating the passive scatter element, for example from a horizontal direction to a vertical direction or to diagonal directions of +45° or −45°. The number of required optical components is advantageously reduced in this design, since no deflection grating element and also no controllable optical element are necessary. However, a device for the mechanical rotation of the scatter element is required instead.

In principle, however, the invention is not restricted to the use of specific types of scatter elements for changing the scatter direction. The use of a single, electronically controllable, one-dimensional scatter element modifiable in its scatter direction would also be conceivable.

Figure 6:
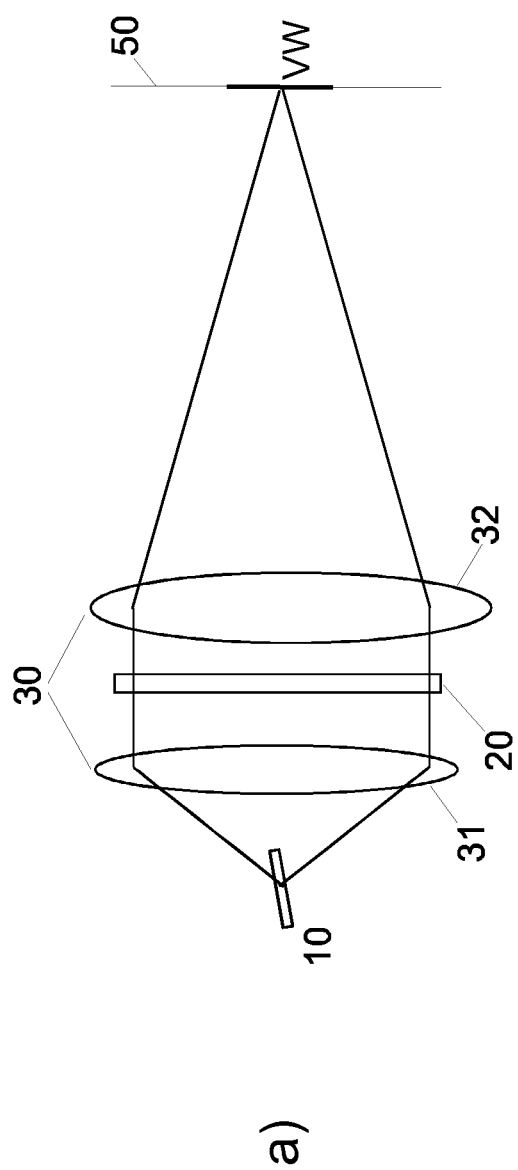
FIG. 6: a schematic representation of a holographic display device according to the invention with an alternative tracking device to FIG. 5.
Figure 6:
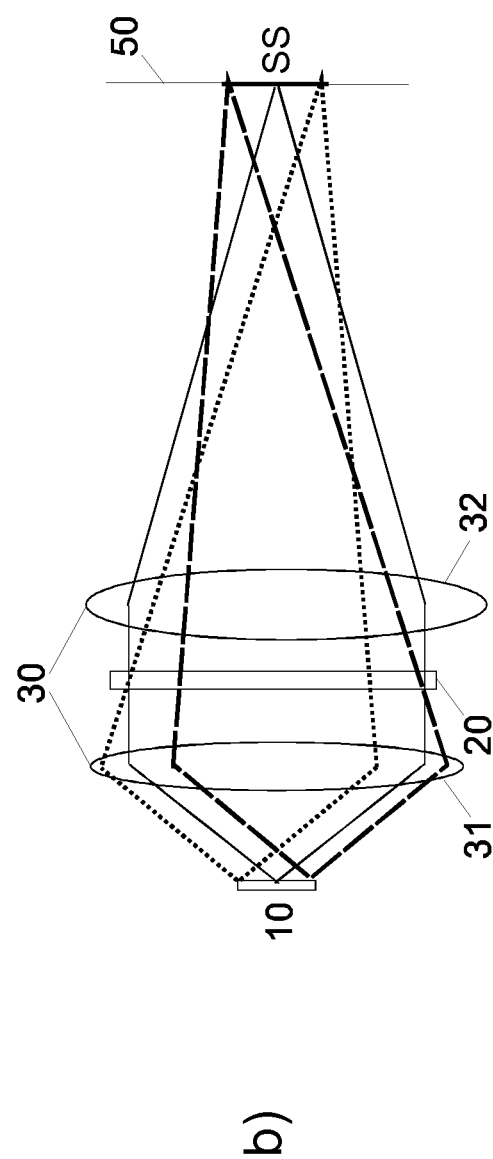

A further example embodiment for tracking a virtual visibility region to a new position of an eye or a pupil of an eye of an observer is shown in FIG. 6. The display device shown there comprises an illumination device 10 with at least one light source, an SLM 20 and an optical system 30. The light source of the illumination device 10 is designed here as slit-shaped or slot-shaped and illuminates the SLM 20 with sufficiently coherent light. The optical system 30 comprises imaging elements, here two imaging elements 31 and 32, where a special arrangement of the imaging elements is not provided. Only one single imaging element, for example, which is disposed upstream or downstream of the SLM 20 in the light propagation direction could also be provided. Alternatively, more than two imaging elements can also be provided.

The SLM 20 is illuminated here with light by means of the imaging element 31 which is disposed between the illumination device 10 and the SLM 20. The light is focused on a virtual visibility region in an observer plane 50 with the further imaging element 32 of the optical system 30 disposed downstream of the SLM 20 in the light direction.

Illustration a) in FIG. 6 shows the generation of a virtual observer window VW in the observer plane 50 in the drawing plane. The light source of the illumination device 10 is moved or rotated here in such a way that the narrow or short side of the slit-shaped or slot-shaped light source illuminates the SLM 20. The light source is drawn here in a perspective view for illustrative purposes in order to make it clear that it has a slot-shaped form. Strictly speaking, the long side of the slot of the light source would lie perpendicular to the drawing plane and would not be visible in the side view. A very small angular spectrum of the light is generated downstream of the following imaging element 31 due to the small extension of the light source in this light propagation direction. The SLM 20 is illuminated with essentially parallel light. Apart from the diffraction by the pixels of the SLM 20 which is, however, not shown here and which generates the virtual observer window VW, the light emitted by the light source in the observer plane 50 in this direction which corresponds to the encoding direction of the hologram which is to be encoded into the SLM 20 is again focused on a more or less point-shaped area.

The light source of the illumination device 10 is moved or rotated as shown in illustration b) of FIG. 6 in order to track the virtual visibility region to a new or different position of the eye or the pupil of the eye of the observer. The light source is moved or rotated in such a way that the long side of the slit-shaped or slot-shaped light source now illuminates the SLM 20. The light which is now emitted from the light source from different positions and is shown as continuous, dotted or dashed lines then strikes the SLM 20 at different angles and is thereby also imaged by means of the imaging element 32 at different positions in the observer plane 50. The light is consequently scattered in this direction. A sweet spot SS is thus generated in the observer plane 50 due to the use of the long side of the slit-shaped or slot-shaped light source of the illumination device 10 in order to illuminate the SLM 20.

In this way, irrespective of the diffraction on the pixels of the SLM 20, a slit-shaped or slot—also shaped image of the slit-shaped or slot-shaped light source is generated in the observer plane 50 with a short direction in which the virtual observer window VW is formed, and a long direction in which the sweet spot SS is formed.

The slit-shaped or slot-shaped light source of the illumination device 10 is rotated in order to determine a suitable encoding direction of a hologram on the SLM 20. The slit or slot of the light source can then be disposed, for example, in such a way that the long side of the light source is present in a horizontal or vertical direction or at an angle of +45 degrees or −45 degrees in relation to the horizontal line L according to FIG. 4, and the short or narrow side of the light source is provided in each case perpendicular to this direction.

Figure 7:
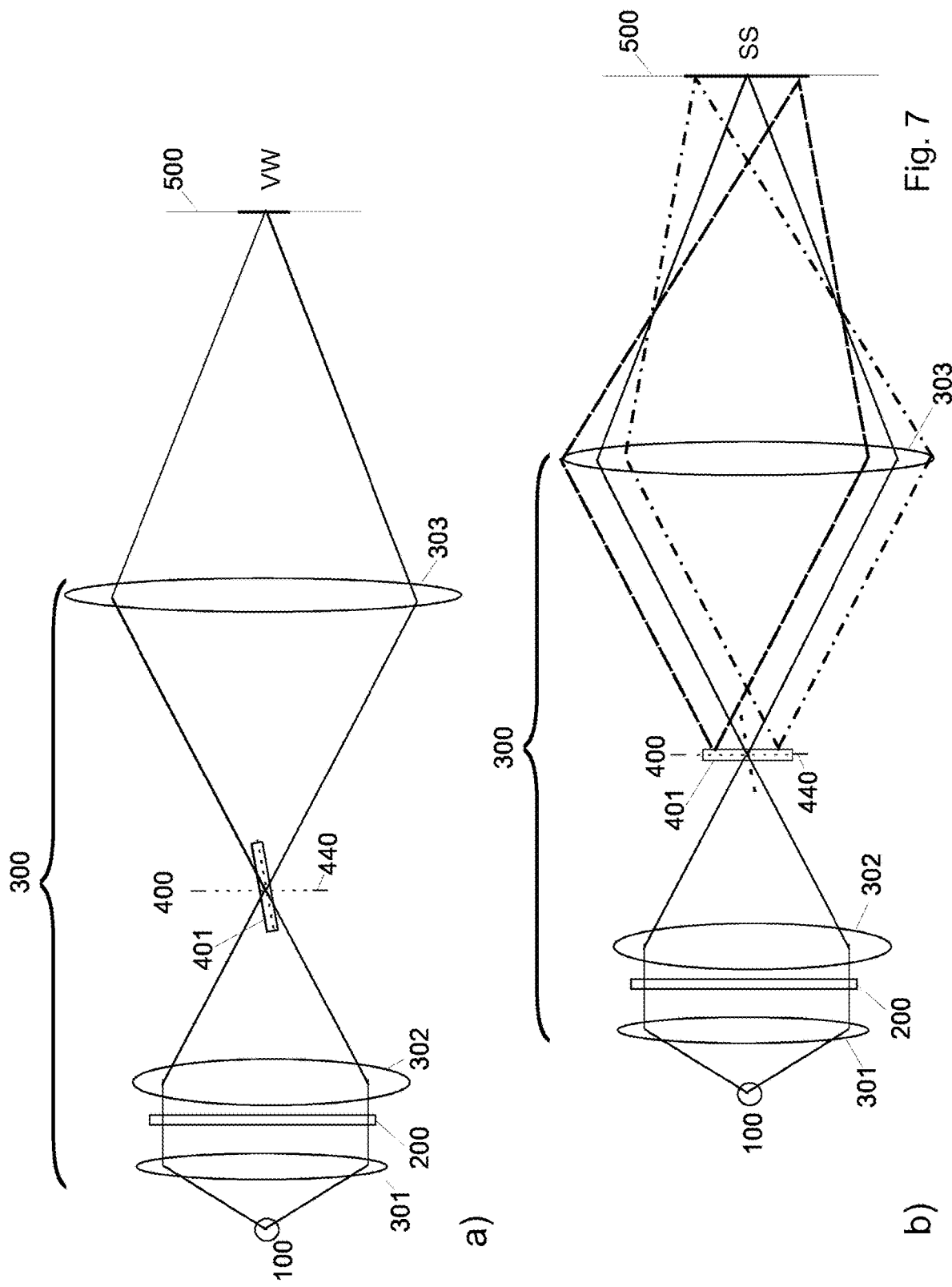
FIG. 7: a schematic representation of a holographic display device according to the invention with a further alternative tracking device to FIGS. 5 and 6.

A further example embodiment for tracking a virtual visibility region to a new position of an eye or a pupil of an eye of an observer is shown in FIG. 7. A tracking device of the display device is designed here as a filter arrangement. For this purpose, the display device comprises an illumination device 100 having at least one light source, an SLM 200, an optical system 300 and a tracking device 400 which is designed as a filter arrangement. The optical system 300 comprises at least one imaging element, here three imaging elements 301, 302 and 303. The SLM 200 is illuminated by means of the light source of the illumination device 100 and by means of an imaging element 301 of the optical system 300 in order to generate a virtual visibility region in an observer plane 500. A further imaging element 302 downstream of the SLM 200 in the light propagation direction focuses the light into a filter plane 440 in which an intermediate image of the light source or a Fourier transform of the SLM 200 is generated. This filter plane 440 can therefore also be referred to as an intermediate image plane of the light source image or as a Fourier plane of the SLM 200. An imaging element 303 disposed downstream of the filter plane 440 in the light direction then images this intermediate image plane or Fourier plane 440 into the observer plane 500, thereby generating a virtual visibility region which is formed by a virtual observer window VW and a sweet spot SS. Diffraction orders which are produced due to the pixel structure of the SLM 200 and are shown by dashed lines are drawn schematically in the filter plane 440. The tracking device 400 comprises an aperture or diaphragm 401 which filters out incident light accordingly. This means that specific, wanted diffraction orders are allowed through and other diffraction orders are filtered out by means of the aperture 401 in the filter plane 440.

The position of the diffraction orders and the orientation of the filter aperture 401 are indicated in a perspective view in this figure for illustrative purposes. Strictly speaking, the horizontal diffraction orders and also the long direction of the filter aperture 401 are located perpendicular to the cross-section plane of the drawing in illustration a) of FIG. 7.

In illustration a) of FIG. 7, the aperture 401 of the tracking device 400 is disposed in the display device in such a way that it allows through only one diffraction order in the vertical direction, but a plurality of diffraction orders are allowed through in the horizontal direction. A virtual observer window VW is generated in this way in the vertical direction. An aperture 401 disposed in this way can be used for a vertical encoding direction of a hologram or subhologram which is to be encoded into the SLM 200.

In illustration b) in FIG. 7, the aperture 401 in the filter plane 440 is now disposed in the display device in such a way that the aperture 401 now allows through only one diffraction order in the horizontal direction and a plurality of diffraction orders in the vertical direction. A sweet spot SS is thus generated in the vertical direction. An aperture disposed in this way can be used for a horizontal encoding direction of holograms or subholograms on the SLM 200.

It is not generally necessary for a whole number of diffraction orders to be used in the sweet spot direction, but rather the size of the aperture 401 can also comprise fractions of diffraction orders. The aperture 401 can, for example, have a size of 4.4 diffraction orders. The aperture 401 should have a maximum size of one diffraction order in the encoding direction of a hologram or subhologram. However, the aperture 401 may also be smaller in size than one diffraction order. Furthermore, the center of the aperture 401 does not have to coincide with the center of a diffraction order, but can also be offset in relation thereto. The aperture 401 can also be structured so that it additionally filters out artefacts, such as, for example, zero order spots. In the simplest case, the aperture 401 of the tracking device 400 can be a mechanically rotatable aperture diaphragm. The aperture 401 could, for example, also be designed as an electrically controllable aperture which is based, for example, on liquid crystals (LCD) and which absorbs or transmits light according to the switching state.

As already described, the rotation of the encoding direction of a hologram can also be combined in specific embodiments of the invention with a small shift of the virtual observer window through encoding of prism functions or prism terms in the hologram. If an aperture is used, this can advantageously be done by designing the aperture not only as rotatable, but also as shiftable over a small region, for example in the encoding direction by plus/minus one diffraction order. In illustration a) in FIG. 7, the aperture 401 would thus be shifted additionally in the vertical direction. In illustration b) in FIG. 7, the aperture 401 would be shifted additionally in the horizontal direction in each case to improve the overlap of the virtual visibility region, i.e. the virtual observer window and the sweet spot, with the pupil of an eye.

Figure 8:
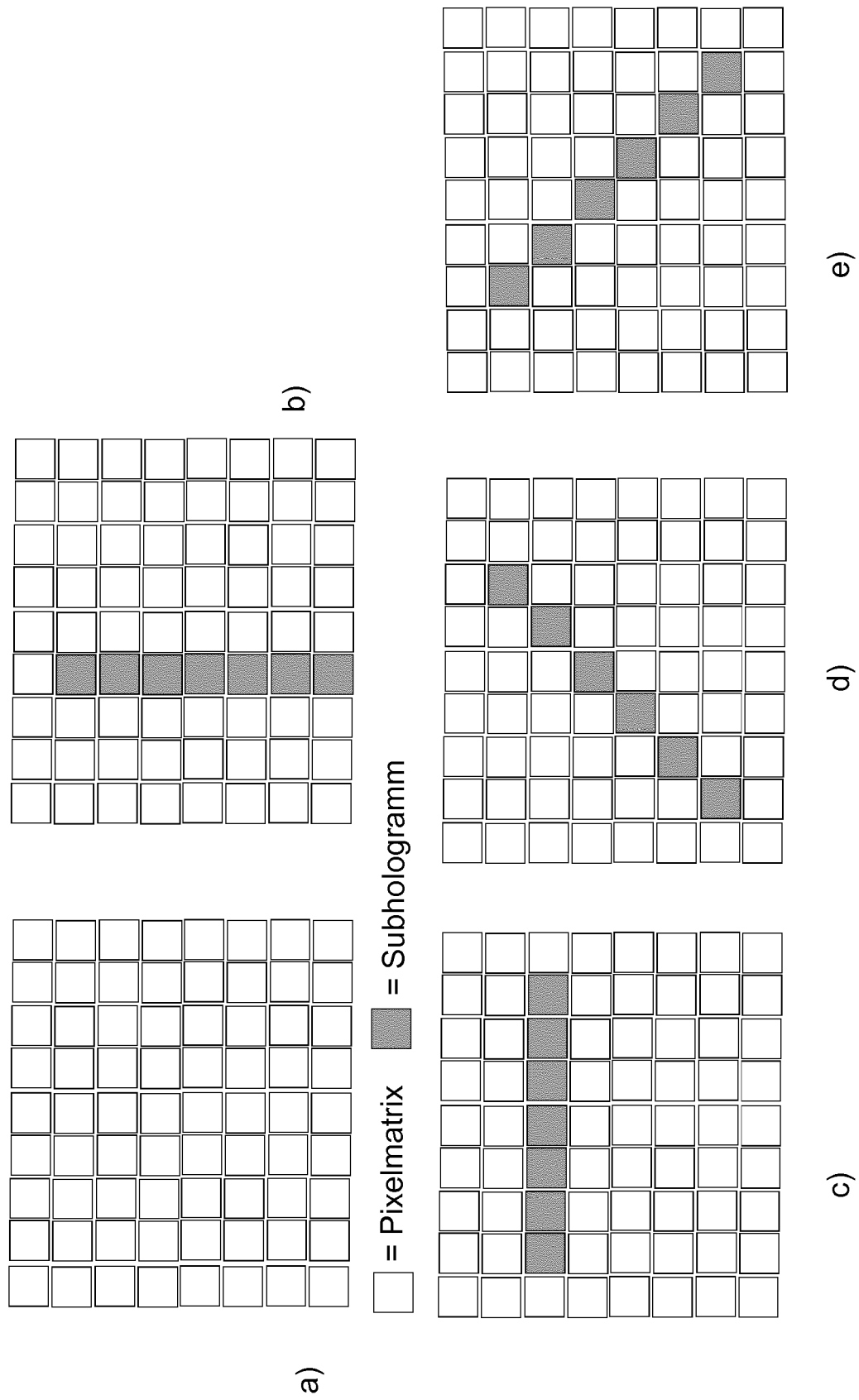
FIG. 8: a schematic representation of subholograms with different encoding directions on a spatial light modulation device in illustrations a) to e)

A pixel matrix of an SLM is shown in FIG. 8. As can be seen, the SLM has square pixels in this case. In illustration a) in FIG. 8, only one SLM of this type is shown, where illustrations b) to e) show subholograms with different encoding directions which can be provided according to the invention in order to track the virtual visibility region to a new position of the eye or the pupil of the eye. Illustration b) shows a subhologram having a vertical encoding direction, where the subhologram is indicated by grey-shaded pixels. Illustration c) shows a subhologram with a horizontal encoding direction. Illustration d) shows a subhologram having a diagonal encoding direction, here in a −45 degree direction. Illustration e) shows a subhologram similarly with a diagonal encoding direction, but where the encoding direction of the subhologram here is +45 degrees. The hologram of a preferably three-dimensional scene would be calculated in each case by adding up the subholograms of the individual object points, where all subholograms have the same encoding direction.

Figure 9:
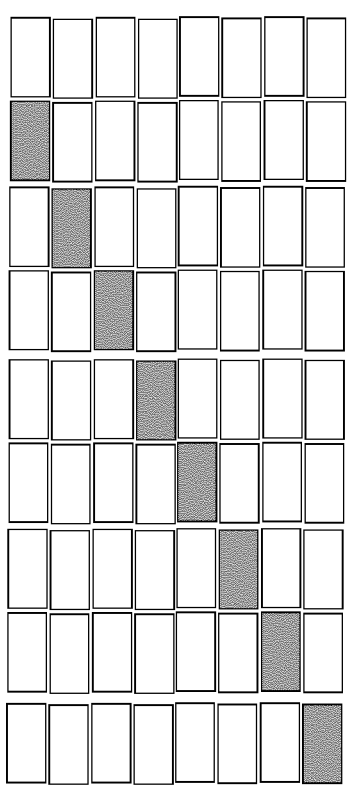
FIG. 9: a schematic representation of subholograms with further different encoding directions on a spatial light modulation device in illustrations a) to d)
Figure 9:
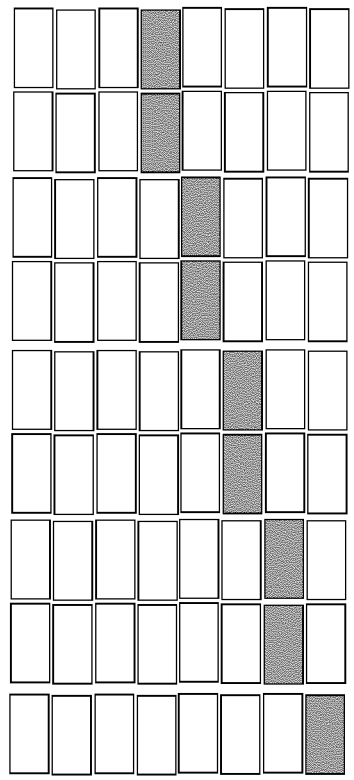
Figure 9:
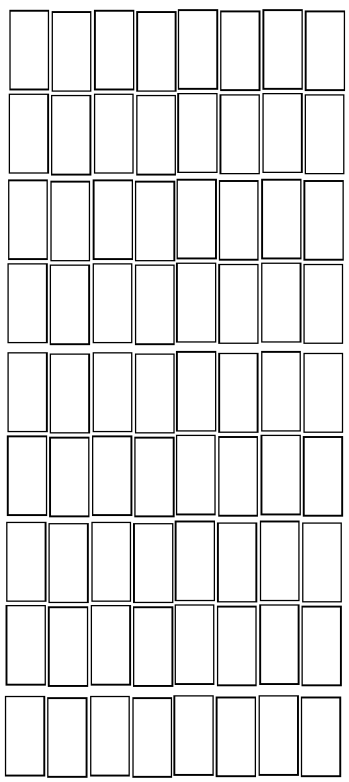
Figure 9:
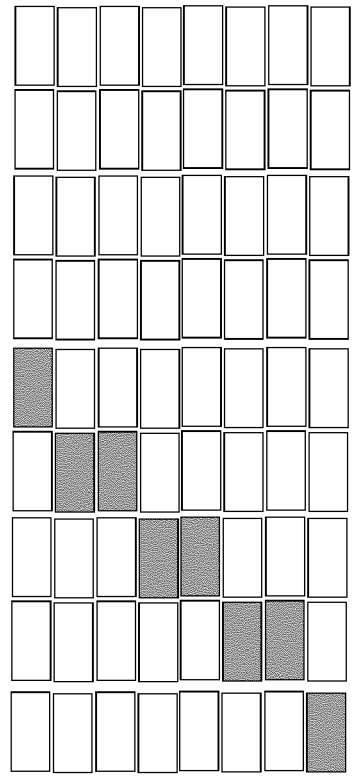

FIG. 9 shows an alternative design of an SLM which can be provided in a display device for tracking a virtual visibility region. Here, the SLM now has a pixel matrix with rectangular pixels. Illustration a) in FIG. 9, shows only an SLM of this type with rectangular pixels, where illustrations b) to d) show subholograms with different encoding directions which can be provided according to the invention in order to track the virtual visibility region to a new position of the eye or the pupil of the eye. Illustration b) shows a encoding direction of a subhologram in which the pixels are in each case offset diagonally in relation to one another.

The aspect ratio of the rectangular pixels thus produces an angle of approximately 25 degrees to the horizontal side of the SLM. This shows that the invention is not intended to be restricted to the angles of the encoding direction shown in FIG. 8, i.e. the horizontal angle (0°), vertical angle (90°) and diagonal angle (+45°; −45°), but a encoding direction of 25°, for example, could also be used in this case.

Illustrations c) and d) in FIG. 9 show that encoding directions for a hologram can also be interpolated depending on the pixel matrix of the SLM. Illustration c) shows a subhologram for a encoding direction of 50 degrees. This is achieved by always encoding two pixels upwards and one pixel to the right in the pixel matrix of the SLM. Illustration d) shows a subhologram for a encoding direction of approx. 12.5°. This is achieved here by always encoding two pixels to the right and one pixel upwards on the SLM.

In an arrangement of this type, more than four encoding directions can also be used for a hologram on the SLM, such as, for example, the encoding directions 0°, 90°, ±12.5°, ±25° and ±50°, thus in this case eight encoding directions, where these numerical values again represent examples only. The different possible encoding directions can be achieved here by means of a tracking device according to FIG. 5, 6 or 7 which allow the corresponding angular settings. This means that, with the at least one optical element in the form of a scatter element or with at least one passive scatter element or with a filter arrangement as a tracking device or with at least one light source as a tracking device, an angle for the encoding direction, for example of 25° according to illustration b) in FIG. 9, should be settable so that this specific tracking device according to FIG. 5, 6 or 7 can be used. The aforementioned angle is intended to serve only as an example and for explanation.

If a scatter element is used, the scatter direction of the light or, if a slot-shaped light source is used, the long side of the slot-shaped light source or, if an aperture is used, the long side of the aperture in a filter plane of the display device corresponds in each case to the sweet spot direction. The non-scattering direction or the short side of a slot-shaped light source or the short side of an aperture in the filter plane corresponds to the encoding direction.

Conversely, the subholograms have an extension of a plurality of pixels in the encoding direction, but normally only an extension of one pixel perpendicular to the encoding direction. The long side of the subhologram consequently points in the encoding direction and the short side of the subhologram points perpendicular to the encoding direction.

In other words, the scatter direction of the light, the long side of the light source or the long side of the filter aperture in each case stand perpendicular on the long side of the subhologram.

Figure 10:
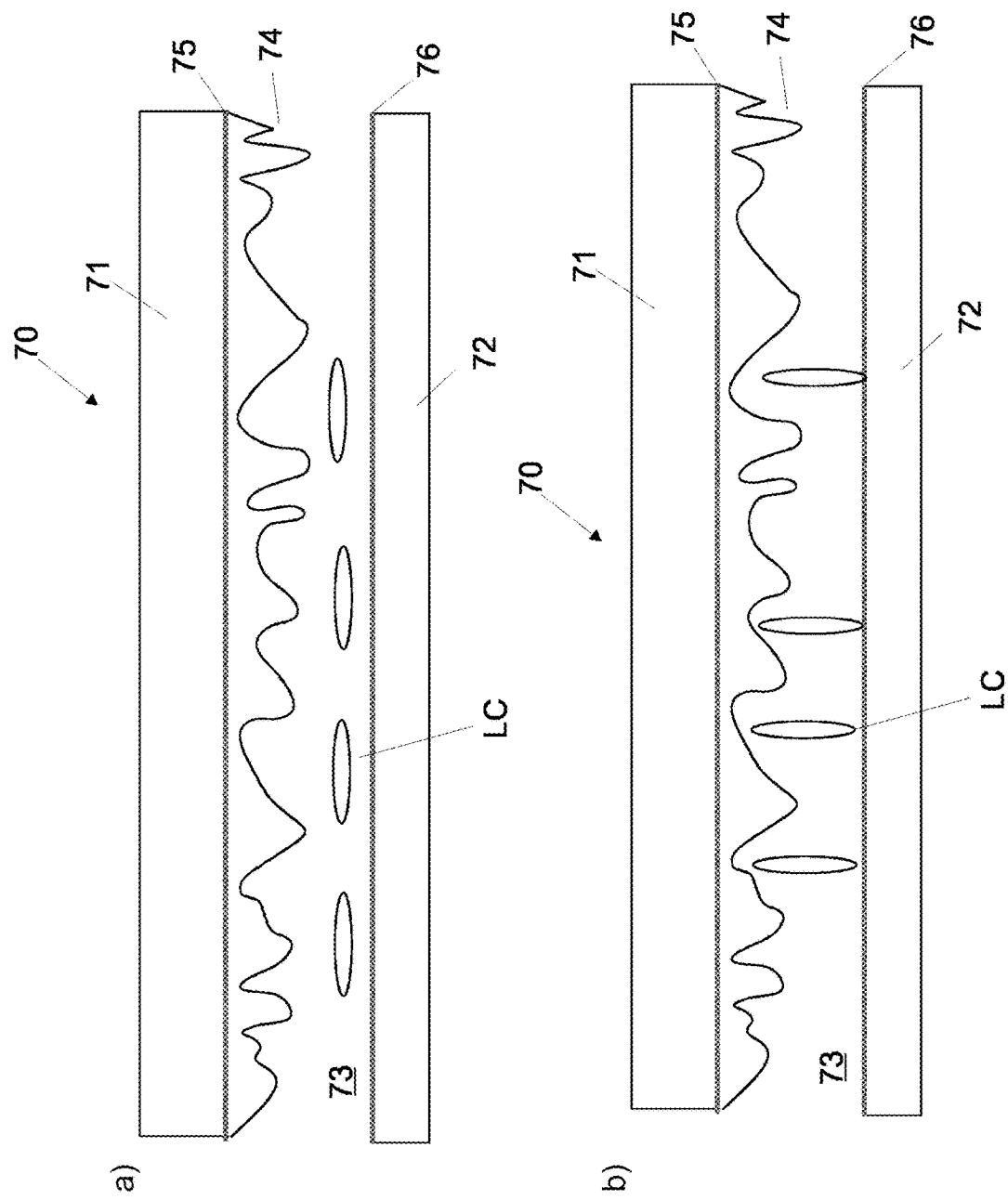
FIG. 10: a schematic representation of a design of a controllable optical element of a tracking device according to the invention.

According to FIG. 10, a design of a controllable optical element of a tracking device is now described which, for example, the display device according to FIG. 5 could comprise. However, the invention is not intended to be restricted to a controllable optical element designed in this way. A controllable optical element of the tracking device can therefore also have a different design which guarantees controllability or switchability.

A controllable optical element 70 comprises two substrates 71 and 72. The two substrates 71 and 72 are joined together, where a space is present between the two substrates 71 and 72 which is filled with a liquid crystal layer 73 having liquid crystals LC or in which a liquid crystal layer 73 is embedded. At least one substrate, here the substrate 71, further has a surface structure 74. The liquid crystal material is birefringent and has a first refractive index, for example the ordinary refractive index, which is essentially identical to the refractive index of the surface structure 74. Both the liquid crystal LC and the surface structure 74 have a refractive index of n=1.5. The birefringent liquid crystal LC further has a second refractive index, for example the extraordinary refractive index, which differs from the refractive index of the surface structure 74. The liquid crystal LC has, for example, an extraordinary refractive index of n=1.7, whereas the refractive index of the surface structure 74 is n=1.5.

The surface structure 74 is, in particular, a one-dimensional statistical surface structure here which is impressed, for example, into a polymer layer which is applied to the substrate 71. Only one substrate preferably has a surface structure 74, wherein the other substrate is designed as flat. Here, this now means that the substrate 71 has the surface structure 74 and the substrate 72 is designed as flat or plane. Due to its flat design, the substrate 72 is used for the alignment of the liquid crystals LC in the liquid crystal layer 73. This means that the liquid crystals LC are oriented on this substrate 72. The liquid crystals LC are aligned accordingly, for example through rubbing or photoalignment.

A light scatter characteristic of the controllable optical element 70 is predefined by the choice of the surface structure 74, i.e. the width, height, statistical distribution of the surface structure 74. The surface structure 74 can be designed, for example, similar to a surface relief grating or blazed grating, where, however, in contrast to conventional grating elements, the grating period and/or the blaze angle can vary randomly with the position on the substrate 71 so that no regular diffraction orders are produced, but light is scattered instead over a predefined angular range. The scattering angle can then be set, for example, over a range, i.e. over a minimum and a maximum grating period, and over a frequency of different grating periods and/or over a range and a distribution of blaze angles. The surface structure 74 can also be an irregular height profile whose width and height are varied randomly with the position on the substrate 71.

The two substrates 71 and 72 furthermore each comprise an electrode arrangement 75 and 76. The substrate 71 has the electrode arrangement 75 which has at least one electrode. The substrate 72 has the electrode arrangement 76 which similarly has at least one electrode. The electrodes of the electrode arrangements 75 and 76 can be designed as plane, i.e. non-pixelated. In this case, the at least one electrode of the electrode arrangement 75 is provided on the rear side of the statistical surface structure 74, i.e. between the surface structure 74 and the substrate 71, in order to generate an uniform field profile.

Through the use of a polarization element in the display device upstream of the controllable optical element 70 in the light propagation direction, or by means of light already polarized in advance in the light path, for example using a light source which radiates polarized light, light polarized on the input side strikes the controllable optical element 70. The liquid crystal LC of the liquid crystal layer 73 is oriented by means of the substrate 70, for example through rubbing or photo alignment, in such a way that, in a control state or switching state of the controllable optical element 70 when no electric field is applied to the electrode arrangements 75 and 76, the refractive index of the liquid crystal LC which differs from the refractive index of the surface structure 74 is effective for the incident light. The statistical surface structure 74 is optically visible in this state. The surface structure 74 then causes a scattering effect of the light. This is shown in illustration a) in FIG. 10.

In a different control state or switching state of the controllable optical element 70, when a sufficiently strong electric field is applied to the electrode arrangements 75 and 76, the refractive index of the liquid crystal LC which corresponds to the refractive index of the surface structure 74 takes effect. This is shown in illustration b) in FIG. 10. The statistical surface structure 74 is optically invisible in this control state of the controllable optical element 70 due to the identical refractive index of the surface structure 74 and of the liquid crystal LC. The surface structure 74 and the liquid crystal LC act as a plane parallel plate. No light is therefore scattered downstream of the controllable optical element 70.

The alignment of the liquid crystal LC can correspond, for example, to an ECB (electrically controlled birefringence) mode. With the applied voltage switched off, i.e. with no electric field present, on the electrode arrangements 75, 76, the liquid crystal molecules are oriented in the plane of the substrate 72, as shown in illustration a). With the applied voltage switched on, i.e. with an electric field present between the electrodes of the electrode arrangements 75, 76, the liquid crystal molecules are oriented perpendicular to the plane of the substrate 72, as shown in illustration b). However, the invention is not intended to be restricted to this arrangement of the liquid crystal molecules. Other orientations of the liquid crystal molecules can also be present, for example a VA (vertical alignment) mode in which, with no applied voltage, the liquid crystal molecules are oriented perpendicular to the plane of the substrate 72 and, with an applied voltage, i.e. with an electric field present between the electrodes of the electrode arrangements 75, 76, the liquid crystal molecules are oriented parallel to the plane of the substrate 72.

If a plurality of controllable optical elements are present in a tracking device in a display device, they can be disposed in such a way that their statistical surface structures in each case have a different orientation. Identically designed controllable optical elements, for example, can be rotated through 90 degrees in relation to one another. If, for example, a voltage is then applied to a first controllable optical element downstream of the SLM in the light propagation direction and no voltage is applied to a following second controllable optical element, the incident light is scattered in a first direction. Conversely, if no voltage is applied to the first controllable optical element, but a voltage is applied instead to the second controllable optical element, the incident light is scattered in a second direction which is different from the first direction.

It is generally also possible with a combination of a plurality of controllable optical elements, i.e. at least two controllable optical elements, to switch between a one-dimensional scattering and a two-dimensional scattering or to select between a scattering and a non-scattering state.

The invention is not limited to the example embodiments presented here. Finally, it should also be quite specifically mentioned that the example embodiments described above serve only to describe the claimed teaching, but said teaching is not intended to be restricted to the example embodiments.

The invention claimed is:

1. A display device for representing two-dimensional and/or three-dimensional scenes, comprising:
    at least one illumination device to emit sufficiently coherent light,
    at least one spatial light modulation device into which a hologram is encoded by means of a single-parallax encoding,
    at least one optical system, where the at least one optical system is provided to generate at least one virtual visibility region at the position of an eye of an observer, and
    a tracking device, where the encoding direction of the hologram on the spatial light modulation device is modifiable by means of the tracking device, wherein, while an eye of an observer remains located at a particular position, the encoding direction of the hologram is changeable between at least two non-coinciding directions and the encoding direction is switchable between the at least two directions based on the tracking device.

2. The display device as claimed in claim 1, wherein the at least one virtual visibility region is formed from a virtual observer window and a sweet spot, where the virtual observer window is provided in the encoding direction of the hologram and the sweet spot is provided in the non-encoding direction of the hologram.

3. The display device as claimed in claim 1, wherein at least one position detection system is provided with which the position of an eye, in particular an eye pupil, of an observer of the scene is determinable.

4. The display device as claimed in claim 1, wherein the tracking device comprises at least one controllable optical element which is disposed between the at least one illumination device and an observer plane in which an observer of the scene is located.

5. The display device as claimed in claim 4, wherein the at least one controllable optical element is designed as a polarization switch, wherein the tracking device comprises at least one passive deflection grating element, preferably a polarization grating element, and at least two passive scatter elements which scatter incident light in one direction only, where the passive deflection grating element and the at least two passive scatter elements operate in combination with the polarization switch.

6. The display device as claimed in claim 5, wherein the at least two passive scatter elements are designed as volume gratings, where the at least two passive scatter elements have a different angular selectivity.

7. The display device as claimed in claim 4, wherein the at least one controllable optical element is designed as a polarization switch, where the tracking device comprises at least one redirection element, preferably a polarization beam-splitter element, and at least two passive scatter elements which scatter incident light in each case in one direction only, where one of at least two different light paths is selectable by means of the controllable optical element and the redirection element, and a scatter element is provided in each case in each of the different light paths.

8. The display device as claimed in claim 4, wherein the at least one controllable optical element or the at least two controllable optical elements is/are designed as scatter element(s), where the at least one controllable optical element scatters incident light in one direction only, where the at least two controllable optical elements scatter incident light in each case in a different direction.

9. The display device as claimed in claim 4, wherein the at least one controllable optical element comprises two substrates between which a liquid crystal layer is embedded.

10. The display device as claimed in claim 9, wherein at least one substrate of the at least one controllable optical element has a one-dimensional surface structure.

11. The display device as claimed in claim 10, wherein the surface structure has a grating period which varies randomly with the position on the substrate.

12. The display device as claimed in claim 10, wherein the substrate lying opposite the substrate with the surface structure is provided for the alignment of liquid crystals in the liquid crystal layer.

13. The display device as claimed in claim 10, wherein the liquid crystal material of the liquid crystal layer has a first refractive index and a second refractive index, where the first refractive index essentially corresponds to the refractive index of the surface structure, where the second refractive index is essentially different from the refractive index of the surface structure.

14. The display device as claimed in claim 10, wherein, if a plurality of controllable optical elements are present in which at least one substrate has a one-dimensional surface structure, these controllable optical elements are disposed in the beam path in such a way that the one-dimensional surface structures of the individual controllable optical elements provided on at least one substrate in each case have a different orientation in relation to one another.

15. The display device as claimed in claim 14, wherein the surface structures of the controllable optical elements are disposed at an angle of approx. 90° in relation to one another.

16. The display device as claimed in claim 9, wherein the substrates of the at least one controllable optical element in each case comprise an electrode arrangement, where the respective electrode arrangement comprises at least one electrode.

17. The display device as claimed in claim 1, wherein the tracking device comprises a passive scatter element which is designed as rotating.

18. The display device as claimed in claim 1, wherein the tracking device comprises at least two controllable optical elements.

19. The display device as claimed in claim 18, wherein a first controllable optical element scatters incident light in a predefined first direction, where a second controllable optical element scatters light in a predefined second direction, where the first direction and the second direction are different.

20. The display device as claimed in claim 19, wherein the encoding direction of the hologram is definable through corresponding control of the first controllable optical element and the second controllable optical element.

21. The display device as claimed in claim 1, wherein at least one polarization element is provided upstream of the at least one controllable optical element in the light propagation direction.

22. The display device as claimed in claim 1, wherein the tracking device is designed as a filter arrangement which is provided to eliminate diffraction orders.

23. The display device as claimed in claim 22, wherein the filter arrangement is designed as controllable.

24. The display device as claimed in claim 1, wherein at least one light source of the at least one illumination device is designed as the tracking device, where the at least one light source is designed as controllable in order to modify the coherence property of the light which is to be emitted.

25. The display device as claimed in claim 1, wherein the display device is designed as a holographic display device.

26. A head-mounted display, comprising a display device as claimed in claim 1 in each case for a left eye of an observer and for a right eye of an observer.

27. A method for representing two-dimensional and/or three-dimensional scenes by means of at least one illumination device to emit sufficiently coherent light, at least one spatial light modulation device, at least one optical system, a tracking device and a position detection system, comprising determining a position of an eye of an observer by the position detection system, determining a suitable encoding direction of a hologram on the at least one spatial light modulation device with the at least one optical system and the tracking device, encoding a hologram in the determined encoding direction into the at least one spatial light modulation device by means of a single-parallax encoding, illuminating the at least one spatial light modulation device by the at least one illumination device and reconstructing the hologram by the at least one optical system and generating at least one virtual visibility region at the position of the eye of an observer, and while an eye of an observer remains located at a particular position, changing the encoding direction of the hologram between at least two non-coinciding directions and the encoding direction is switchable between the at least two directions based on the tracking device.

28. The method as claimed in claim 27, wherein the encoding direction in which the virtual visibility region has the largest proportional area of overlap with an eye pupil of the observer is chosen for the hologram is to be encoded.

29. The method as claimed in claim 28, wherein, if the eye position of the observer changes, the new eye position is determined with the position detection system, the virtual visibility region is rotated around its fixed center point in order to select a suitable encoding direction for the hologram is to be encoded, and the direction in which the virtual visibility region has the largest proportional area of overlap with the area of the eye pupil of the observer is determined.

* * * * *